United States Patent
Kiyooka et al.

(10) Patent No.: US 6,687,203 B2
(45) Date of Patent: Feb. 3, 2004

(54) OPTICAL RECORDING MEDIUM, OPTICAL RECORDING AND REPRODUCING DEVICE, AND RECORDING AND REPRODUCING METHOD FOR THE OPTICAL RECORDING MEDIUM

(75) Inventors: Chiaki Kiyooka, Tenri (JP); Nobuo Ogata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 317 days.

(21) Appl. No.: 09/954,820

(22) Filed: Sep. 18, 2001

(65) Prior Publication Data

US 2002/0058118 A1 May 16, 2002

(30) Foreign Application Priority Data

Sep. 19, 2000 (JP) ........................ 2000-284262
Jul. 27, 2001 (JP) ........................ 2001-228659

(51) Int. Cl.$^7$ .................................................. G11B 7/00
(52) U.S. Cl. ................... 369/47.1; 369/59.1; 369/275.4
(58) Field of Search .......................... 369/47.1, 47.11, 369/47.15, 47.21, 47.28, 53.1, 53.2, 53.41, 59.1, 59.25, 275.1, 275.4

(56) References Cited

U.S. PATENT DOCUMENTS 6,128,272 A * 10/2000 Horimai et al. ........... 369/275.4
6,262,950 B1 * 7/2001 Narahara et al. ........ 369/59.23

FOREIGN PATENT DOCUMENTS

JP          11-073685          3/1999

\* cited by examiner

*Primary Examiner*—Muhammad Edun
(74) *Attorney, Agent, or Firm*—David G. Conlin; William J. Daley, Jr.; Edwards & Angell, LLP

(57) ABSTRACT

In an optical recording medium, a groove G and/or a land L composing a recording track includes an interrupted portion of a predetermined length in a direction of the recording track, and the interrupted portion is a clock mark to obtain a clock signal. When (clock mark length C1)/(beam spot size D1)=CM, CM≦1.0. This reduces a region to record the control signal, thereby enabling high-density recording and reproduction, reproducing a control signal having a waveform free from distortion, and generating a clock signal in a state of little jitter.

20 Claims, 19 Drawing Sheets

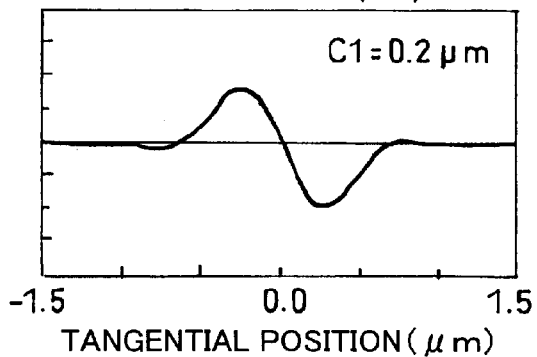
FIG. 6 (a)  C1=0.2 μm
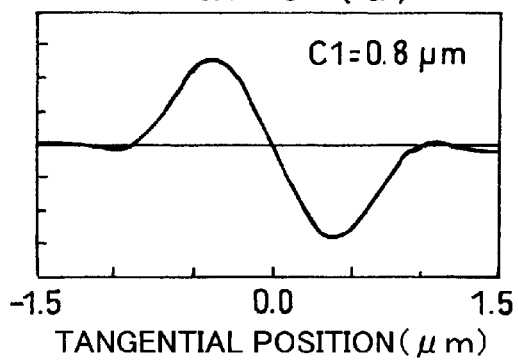
FIG. 6 (d)  C1=0.8 μm
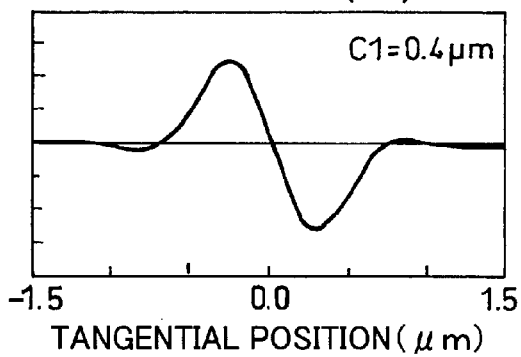
FIG. 6 (b)  C1=0.4 μm
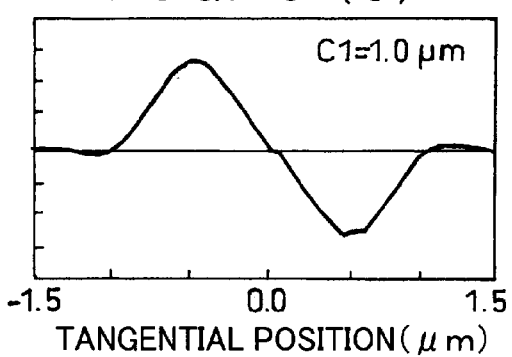
FIG. 6 (e)  C1=1.0 μm
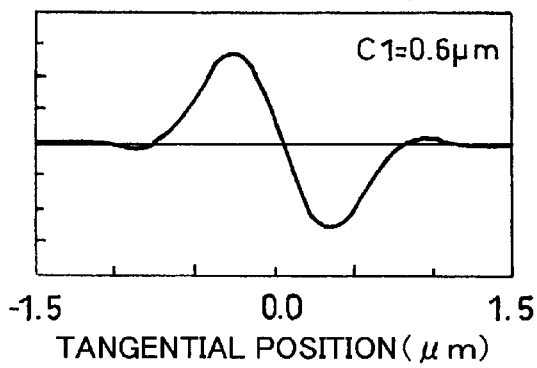
FIG. 6 (c)  C1=0.6 μm
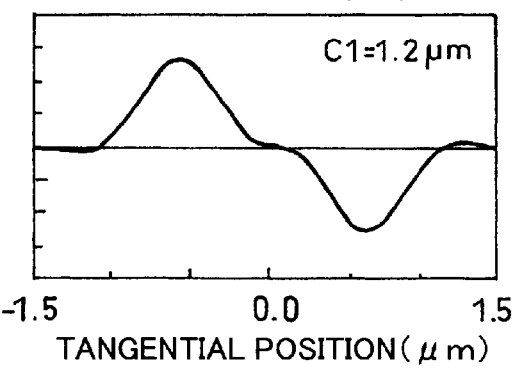
FIG. 6 (f)  C1=1.2 μm

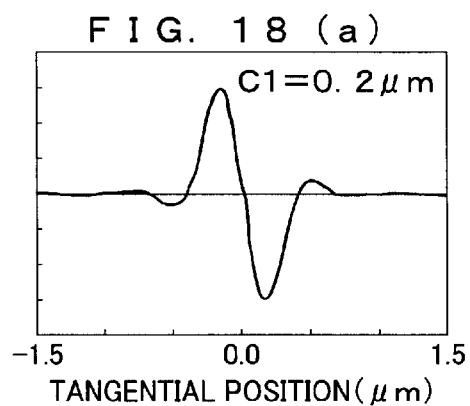
FIG. 18 (a) C1=0.2μm
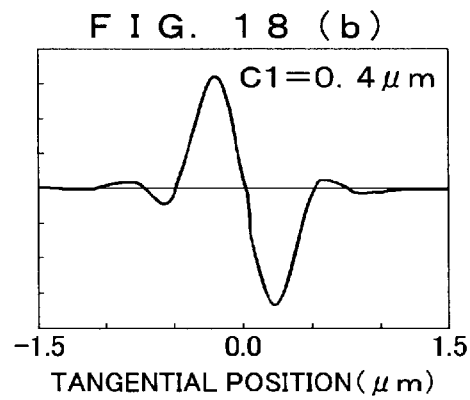
FIG. 18 (b) C1=0.4μm
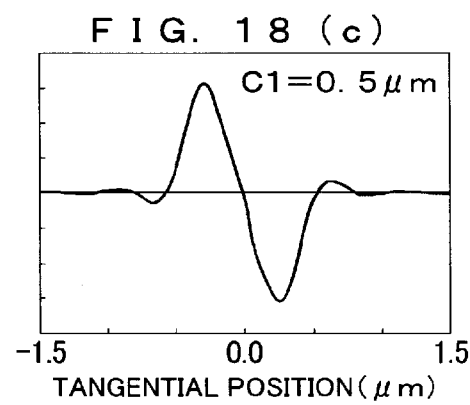
FIG. 18 (c) C1=0.5μm
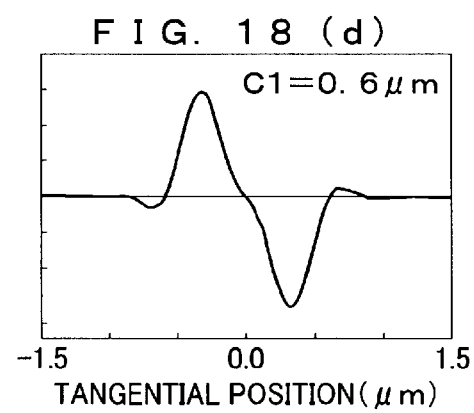
FIG. 18 (d) C1=0.6μm
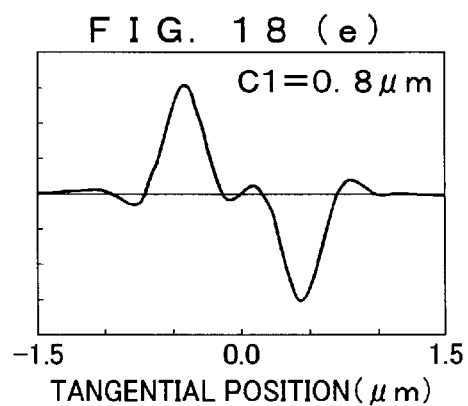
FIG. 18 (e) C1=0.8μm
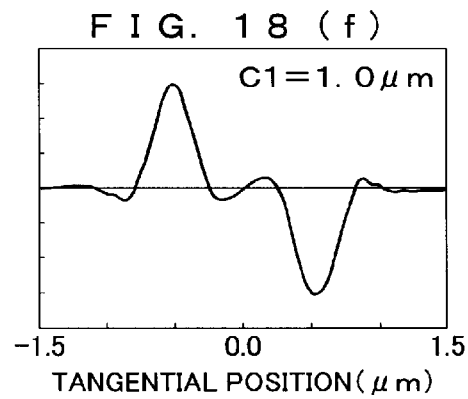
FIG. 18 (f) C1=1.0μm
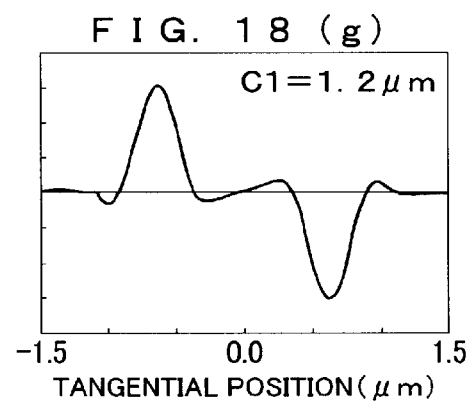
FIG. 18 (g) C1=1.2μm

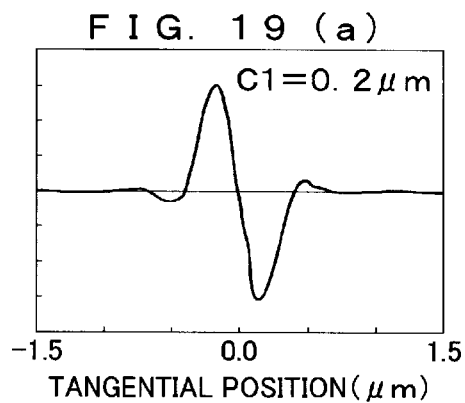
FIG. 19(a) C1=0.2μm
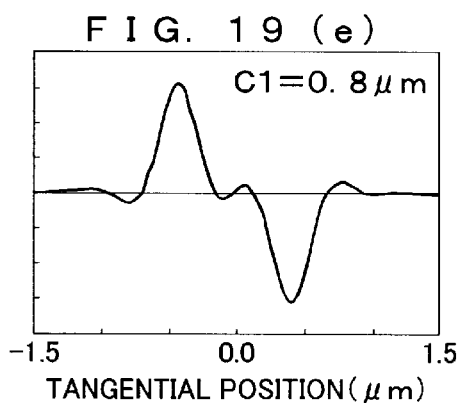
FIG. 19(e) C1=0.8μm
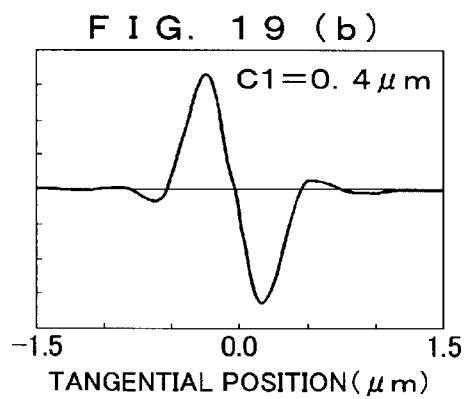
FIG. 19(b) C1=0.4μm
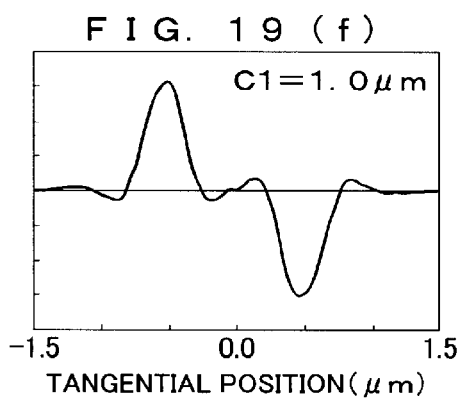
FIG. 19(f) C1=1.0μm
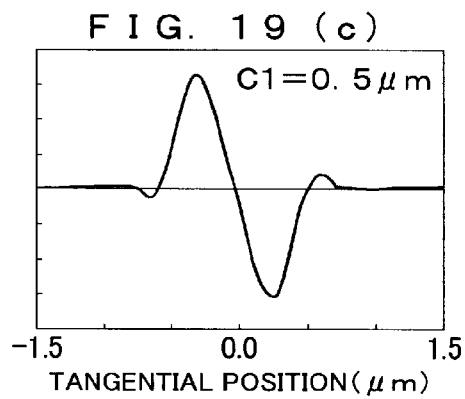
FIG. 19(c) C1=0.5μm
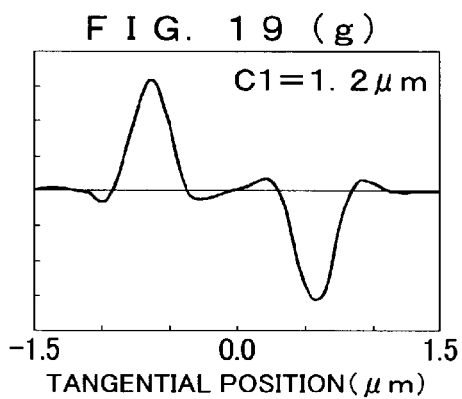
FIG. 19(g) C1=1.2μm
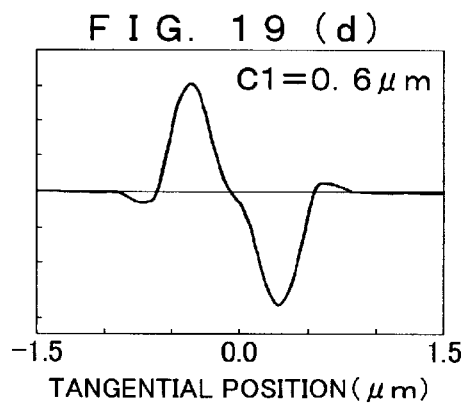
FIG. 19(d) C1=0.6μm

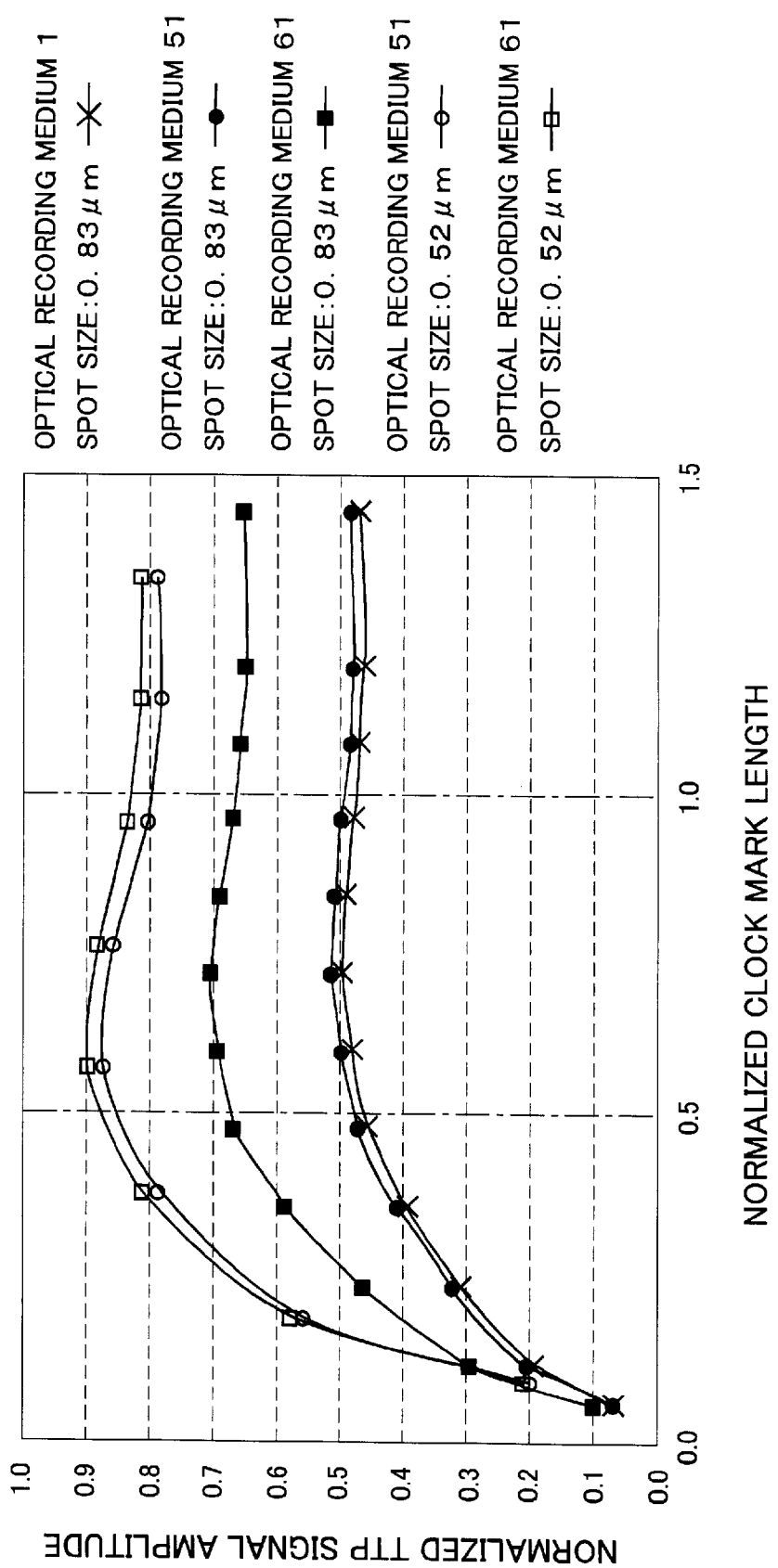

OPTICAL RECORDING MEDIUM, OPTICAL RECORDING AND REPRODUCING DEVICE, AND RECORDING AND REPRODUCING METHOD FOR THE OPTICAL RECORDING MEDIUM

FIELD OF THE INVENTION

The present invention relates to an optical recording medium including recording tracks for recording a signal, which are made up of at least either one of grooves and lands, and an optical recording and reproducing device using this optical recording medium as well as a recording and reproducing method for the optical recording medium.

BACKGROUND OF THE INVENTION

In recent years, for rewritable high-density optical recording media, and in particular magneto-optical recording media, there has been propose d and widely adopted such a format as to realize a large storage capacity ranging between 5 GB and 7 GB on one side of a disk having a diameter of 12 cm which is a common size of a CD. In that case, the thickness of a disk plate is reduced to 0.6 mm so as to allow an optical pickup to have a numerical aperture NA=0.6. Moreover, a single plate structure is adopted to attain magnetic field modulation, where a recording/reproducing laser wavelength λ=630 nm to 650 nm, a track pitch–0.6 μm, and recording line density=0.20 μm/bit.

As a recording format to realize the above large-capacity recording is adopted a land/groove recording system which is capable of recording and reproducing a signal in both lands and grooves, and is effective in attaining high density.

As an example of techniques to attain the high-density optical recording medium using this recording format, a technique disclosed in Japanese Unexamined Patent Publication No. 73685/1999 (Tokukaihei 11-73685 published on Mar. 16, 1999) is known. An optical recording medium according to the publication 11-73685 has an arrangement in which: at least either one of a groove and a land has interrupted portions, or "clock marks", where the groove or land is interrupted at predetermined intervals (the interrupted portions of a predetermined length); a beam spot is set to scan in a peripheral direction of a track so as to generate a tangential push pull signal (hereinafter referred to as "ITPP signal") from the clock mark; and the TPP signal thus generated enables a clock signal to be discharged. Particularly, in this optical recording medium, it is proposed that an effective control signal which causes little jitter when the length of the interrupted portion is larger than 0.8 μm which is a recording/reproducing laser spot size.

However, in order to perform recording and reproducing of an optical recording medium, it is necessary to record such control signals as a clock signal and the like for synchronization of an information signal, and to downsize a recording region for the control signal so as to attain high density.

Further, the above publication only discloses a relationship between a gap length and a sum signal in an optical recording medium having the interrupted portions at predetermined intervals (interrupted portions of the predetermined length), i.e., "gaps", in either one of a land and a groove, and a relationship between the gap length and a TPP signal is not discussed. Furthermore, the above publication discloses neither a relationship between a clock mark length and a TPP signal nor a relationship between the clock mark length and a sum signal in connection with the optical recording medium having the interrupted portions (clock marks) of the predetermined length in the land and groove, respectively.

As a result of researches, the inventors of the present application have discovered that the waveform of a TPP signal is distorted when, for example, a clock mark length exceeds a beam spot size. Specifically, when the clock mark length exceeds the beam spot size, the distortion of the waveform of the TPP signal becomes large at a zero cross point in particular, that causes a problem of increasing a detection error in the clock signal.

Further, in a method of detecting an address signal by one-side wobble, the address signal is detected by a push pull (PP) signal. However, the one-side wobble outputs not only the PP signal but also a TPP signal. The TPP signal here is an address leakage signal. When the address leakage signal has an amplitude which is not smaller than an amplitude of the TPP signal for detecting a clock signal, there arises a problem that such an address leakage signal is erroneously detected as a clock signal.

SUMMARY OF THE INVENTION

The present invention has been attained so as to solve the foregoing problems, and an object of which is to provide an optical recording medium, an optical recording and reproducing device and a recording and reproducing method for the optical recording medium, that are capable of (i) high-density recording and reproduction by reducing a region to record a control signal, (ii) reproduction of the control signal having a waveform free from distortion by appropriately setting a relationship between the length of a clock mark to obtain the control signal and the size of a beam spot to be emitted to the clock mark, and thereby (iii) generating a clock signal in a state of little jitter.

In order to attain the foregoing object, an optical recording medium according to the present invention has an arrangement in which a groove and/or a land composing a recording track includes an interrupted portion of a predetermined length in a direction of the recording track, and the interrupted portion is a control signal mark, such as a clock mark, to obtain such a control signal as a clock signal, wherein: when, by the length of the control signal mark and a spot size of a laser to be emitted to the recording track, (the length of the control signal mark)/(the spot size of the laser)=CM, CM≦1.0.

The control signal mark is reproduced by an optical pickup, thereby obtaining, for example, a tangential push pull (TPP) signal. From the TPP signal is generated a control signal, such as a clock signal.

The inventors of the present application studied a relationship between the control signal mark length and the laser spot size that enables a control signal generating TPP signal free from distortion to be obtained, and discovered the foregoing relationship. More specifically, by setting so that CM≦1.0 when (the control signal mark length)/(the laser spot size)=CM, it was possible to obtain a control signal generating TPP signal free from distortion. This enables generation of a control signal in a state of little jitter.

Further, by setting the control signal mark length and the laser spot size to establish the foregoing relationship, a necessary control signal mark length can be shortened. Consequently, in the optical recording medium, a region to record a control signal is reduced, thereby enabling high-density recording and reproduction.

Further, an optical recording and reproducing device according to the present invention uses an optical recording medium in which a groove and/or a land composing a recording track includes an interrupted portion of a predetermined length in a direction of the recording track, and the interrupted portion is a control signal mark, such as a clock mark, to obtain such a control signal as a clock signal, wherein: when, by the length of the control signal mark and a spot size of a laser to be emitted to the recording track, (the length of the control signal mark)/(the spot size of the laser)=CM, CM≦1.0, the optical recording and reproducing device including: a threshold value setting section for setting such a threshold value as to detect a control signal which was obtained from the optical recording medium at least based on an amplitude of the control signal; a control signal detecting section for making a comparison between the control signal and the threshold value so as to detect a control signal; and a control signal generating section for generating a new control signal based on the control signal detected by the control signal detecting section.

With this arrangement, since CM is set so that CM≦1.0, it is possible to obtain a control signal free from distortion from the control signal detecting section, thereby enabling the control signal generating section to generate a new control signal in a state of little jitter.

Further, a recording and reproducing method for an optical recording medium according to the present invention is capable of performing recording and/or reproduction of information with respect to an optical recording medium in which a groove and/or a land composing a recording track includes an interrupted portion of a predetermined length in a direction of the recording track, and the interrupted portion is a control signal mark to obtain a control signal, wherein: when D is a laser spot size of laser light to be emitted to the optical recording medium, and C1 is the length of the control signal mark, it is set to satisfy 0.66×D≦C1≦0.72×D.

The control signal mark is reproduced by an optical pickup, thereby obtaining, for example, a tangential push pull (TPP) signal. From the TPP signal is generated a control signal, such as a clock signal.

In the case where a reproducing signal from the optical pickup is used to detect the control signal generating TPP signal, the amplitude of the reproducing signal from the optical pickup is compared with a predetermined threshold value, thereby discriminating the control signal generating TPP signal. In that case, in order to accurately perform the discrimination, it is preferable to increase the amplitude of the control signal generating TPP signal.

Accordingly, the inventors of the present application studied a relationship between the control signal mark length and the laser spot size that can increase the amplitude of the control signal generating TPP signal, and discovered the foregoing relationship.

More specifically, by setting to satisfy 0.66×D≦C1≦0.72×D when D is a laser spot size of laser light to be emitted to the optical recording medium, and C1 is the length of the control signal mark, it was possible to obtain a control signal generating TPP signal having a large amplitude. This makes it possible to obtain a desirable control signal surely and in a state free from distortion.

Further, by setting the control signal mark length and the laser spot size to establish the foregoing relationship, a necessary control signal mark length can be shortened. Consequently, in the optical recording medium, a region to record a control signal is reduced, thereby enabling high-density recording and reproduction.

Additional objects, features, and strengths of the present invention will be made clear by the description below.

Further, the advantages of the present invention will be evident from the following explanation in reference to the drawings.

BRIEF DESCRIPTION OF THE DRAWINGS

FIGS. 6(a) through 6(f) show TPP signals which are obtained by an optical pickup having a laser wavelength λ=655 nm and a numerical aperture NA=0.65, when changing a clock mark length of the optical recording medium of FIG. 1 according to one embodiment of the present invention. The respective clock mark lengths are 0.2 μm in FIG. 6(a), 0.4 μm in FIG. 6(b), 0.6 μm in FIG. 6(c), 0.8 μm in FIG. 6(d), 1.0 μm in FIG. 6(e), and 1.2 μm in FIG. 6(f).

FIGS. 18(a) through 18(g) show TPP signals which are obtained by an optical pickup having a laser wavelength λ=410 nm and a numerical aperture NA=0.65, when changing a clock mark length of the optical recording medium of FIG. 14 according to still another example of the present invention. The respective clock mark lengths are 0.2 µm in FIG. 18(a), 0.4 µm in FIG. 18(b), 0.5 µm in FIG. 18(c), 0.6 µm in FIG. 18(d), 0.8 µm in FIG. 18(e), 1.0 µm in FIG. 18(f), and 1.2 µm in FIG. 18(g).

FIGS. 19(a) through 19(g) show TPP signals which are obtained by an optical pickup having a laser wavelength λ=410 nm and a numerical aperture NA=0.65, when changing a clock mark length of the optical recording medium of FIG. 15 according to still another example of the present invention. The respective clock mark lengths are 0.2 µm in FIG. 19(a), 0.4 µm in FIG. 19(b), 0.5 µm in FIG. 19(c), 0.6 µm in FIG. 19(d), 0.8 µm in FIG. 19(e), 1.0 µm in FIG. 19(f), and 1.2 µm in FIG. 19(g).

FIG. 21 is a graph showing a relationship between a normalized clock mark length and a normalized TPP signal amplitude when using an optical pickup having a laser wavelength λ=655 nm and a numerical aperture NA=0.65, and an optical pick up having a laser wavelength λ=410 nm and a numerical aperture NA=0.65, in the respective optical recording media of FIGS. 1, 14 and 15.

DESCRIPTION OF THE EMBODIMENTS

The following will explain embodiments of the present invention with reference to FIGS. 1 through 21. Note that, a laser beam spot size used in the present explanation is set to have an intensity which is $1/e^2$ with respect to the center intensity of a laser emission beam.

Figure 1:
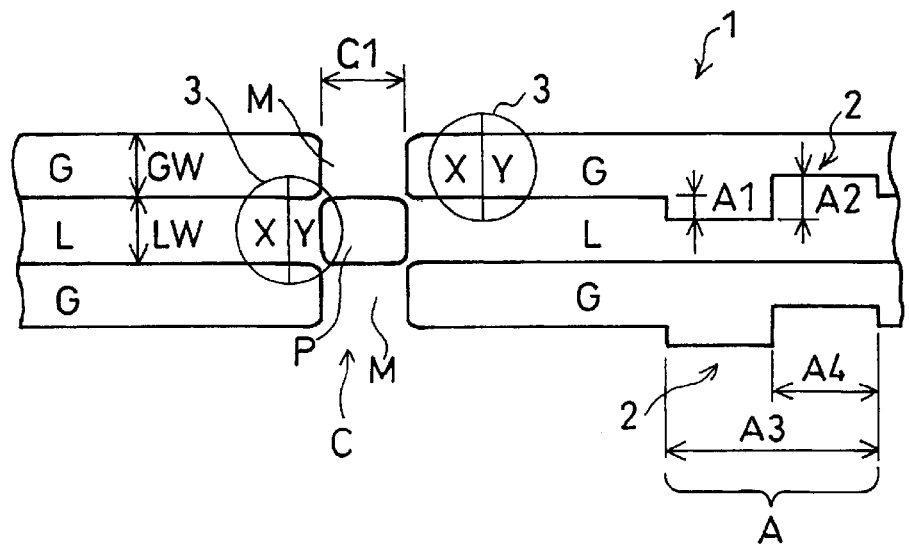
FIG. 1 is an explanatory view showing a main part of an optical recording medium according to one embodiment of the present invention, and in particular a state of formation of a land and grooves.
Figure 2:
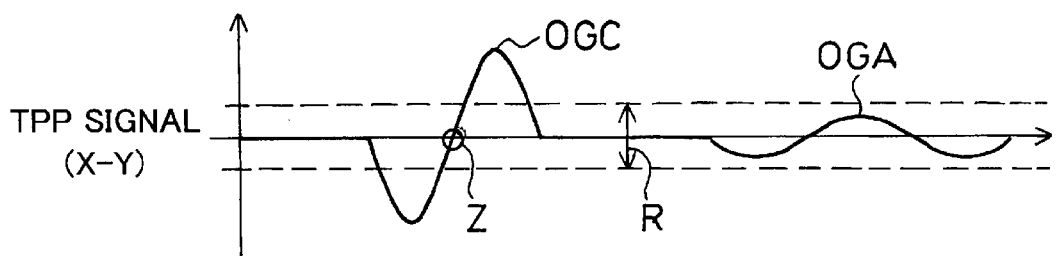
FIG. 2(a) is a waveform diagram showing a TPP signal which is detected by a 2-division photodetector when a laser spot scans a groove G shown in FIG. 1.
FIG. 2(b) is a waveform diagram showing a TPP signal which is detected when the laser spot similarly scans a land L.
Figure 2:
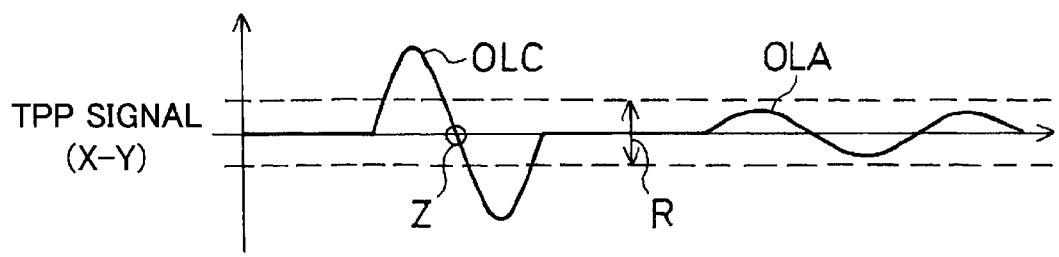

As shown in FIG. 1, an optical recording medium 1 according to the present invention is made up of, for example, a magneto-optical recording medium. The optical recording medium 1 adopts a land/groove recording system and has grooves G and lands L making up a recording track. The grooves G and the lands L are alternately provided in a direction of a diameter ("diameter direction", hereinafter) of the disk-shaped optical recording medium 1. The groove G and the land L have widths GW and LW, respectively, which are set to be substantially the same.

The groove G and the land L are either concentrically or spirally formed, thereby having either a spiral structure or a concentric circular structure.

In the optical recording medium 1, the groove G is marked off at a midpoint where a mirror mark portion M is provided. The groove G is formed as a concave portion on a substrate, whereas the mirror mark portion M is not concave but flat, the height of which is the same as the height of the land L. Accordingly, the mirror mark portion M is an interrupted portion in the groove G, that is, a clock mark (control signal mark).

Meanwhile, the land L is a region which is sandwiched by the grooves G adjacently provided in the diameter direction of the optical recording medium 1. The land L is a flat portion which is as high as the mirror mark portion M. Contrary to the groove G, the land L is marked off at a midpoint by forming a pit P which is a concave portion. Accordingly, the pit P becomes an interrupted portion in the land L, that is, a clock mark. Hereinafter, each region wherein the clock mark is formed is referred to as a clock region C.

On a side wall of the groove G, a wobble 2 (one-side wobble) is provided by causing the surface of the side wall to wobble, that is, causing the surface of the side wall to vary unevenly in the diameter direction. The wobble 2 records an address (a second control signal) The wobble 2 is set so that the depth of the concave portion (the height of a convex portion) is A1, an amplitude is A2 (=2×A1), a period of the amplitude is A3, and the length of the concave portion (the length of the convex portion) in a direction of the recording track is A4 (=A3/2). Hereinafter, a region wherein the wobble 2 is provided is referred to as an address region.

Next, the following will describe a method of generating a clock signal in the optical recording medium 1 having the foregoing arrangement.

In the optical recording medium 1, the center of the groove G which is a track center is exposed to a laser beam, i.e., a beam spot 3, and reflection light is detected by photodetectors X and Y which are two halves of a photodetector divided in a scanning direction of the laser beam, thereby obtaining such a TPP signal (X-Y) as a signal OGC of FIG. 2(a). Note that, for ease of explanation, the photodetectors X and Y are indicated as regions X and Y of the beam spot 3 shown in FIG. 1.

Likewise, the center of the land L which is a track center is exposed to a laser beam, and reflection light is detected by photodetectors X and Y which are two halves of a photodetector divided in the scanning direction of the laser beam, thereby obtaining such a TPP signal (X-Y) as a signal OLC of FIG. 2(b). Thereafter, a zero cross point Z is extracted from each of these TPP signals (first control signals), thereby generating a clock signal (a third control signal).

Meanwhile, an address signal is detected by a PP signal. Like respective signals OGA and OLA shown in FIGS. 2(a)

and 2(b), however, a TPP signal (address leakage signal) emerges even in the address region A. Therefore, in order to eliminate the address leakages signals OGA and OLA, a threshold value R for detecting a clock signal generating TPP signal is set to be smaller than respective amplitudes of the signals OGC and OLC and larger than respective amplitudes of the signals OGA and OLA.

Here, the threshold value R should be modified according to a difference in recording and reproducing conditions for the optical recording medium 1. More specifically, in the case where a reflectance varies in the optical recording medium for recording and reproduction or in the case where a difference in reproducing power results in different quantities of reflection light from the optical recording medium 1, an amplitude of the clock generating TPP signal OGC (OLC) varies. Further, proportionate to variation in the clock generating TPP signal OGC (OLC), an amplitude of the address leakage signal OGA (OLA) varies as well.

Accordingly, the threshold value R is controlled by an optical recording and reproducing device 11 in accordance with a reflectance of reflection light from the optical recording medium 1. Alternatively, the threshold value R may be set at the end of the optical recording and reproducing device 11 by previously writing information of a threshold value R suitable for the optical recording medium 1 into the optical recording medium 1 and reading out the information when performing reproduction.

Figure 3:
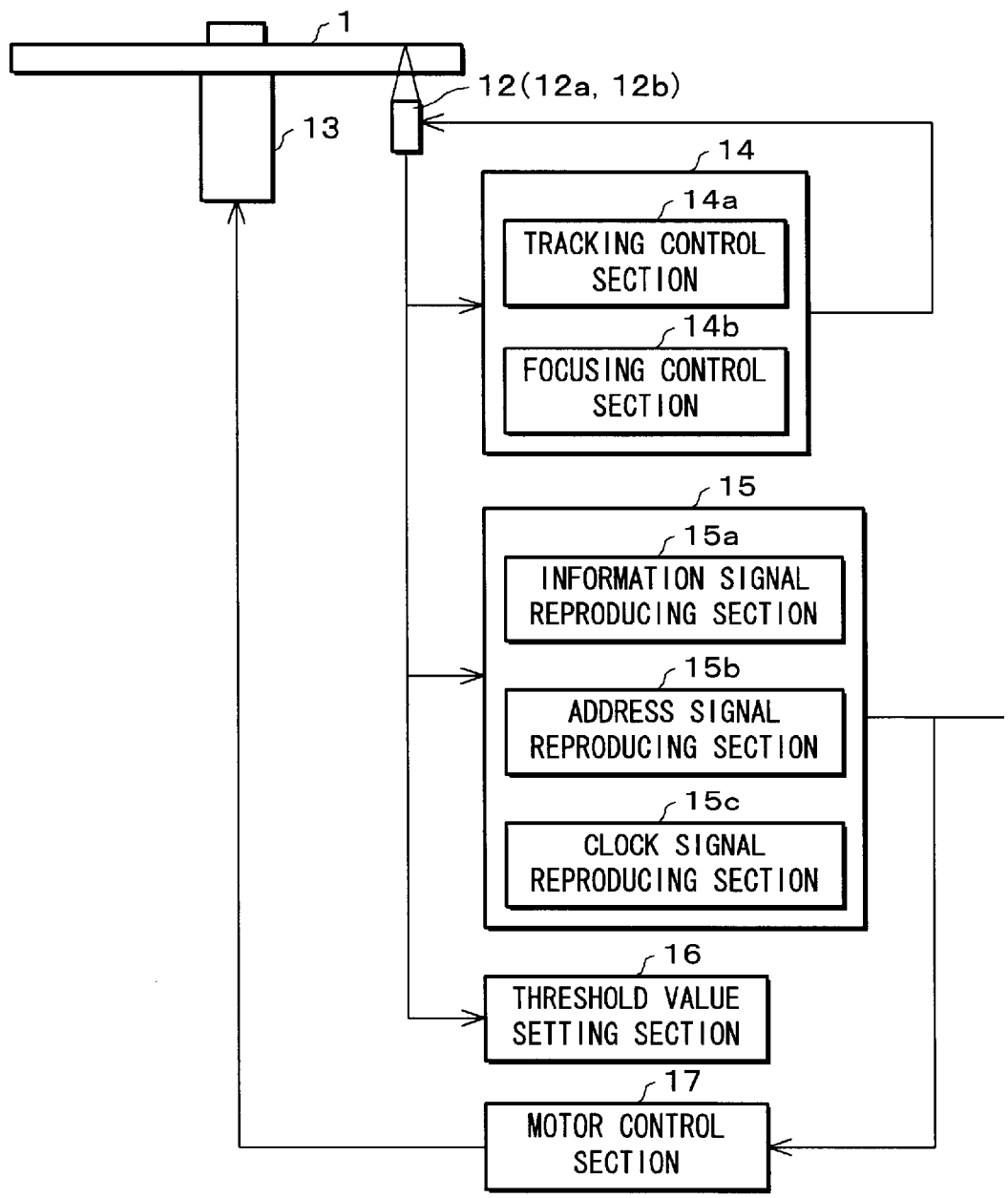
FIG. 3 is a block diagram schematically showing an arrangement of an optical recording and reproducing device using the optical recording medium of FIG. 1.

The above optical recording medium 1 is used, for example, in the optical recording and reproducing device 11 having an arrangement as shown in FIG. 3. This optical recording and reproducing device 11 includes the optical recording medium 1, an optical pickup 12, a spindle motor 13, a pickup control section 14, a signal reproducing section 15, a threshold value setting section (threshold value setting means) 16 and a motor control section 17.

The optical pickup 12 reads out information recorded in the optical recording medium 1 and converts it to an electric signal. The spindle motor 13 rotates the optical recording medium 1 at a predetermined rotational speed. The pickup control section 14 is made up of a tracking control section 14a and a focusing control section 14b, and performs tracking control and focusing control by the control sections 14a and 14b based on an output error signal outputted from the optical pickup 12.

The signal reproducing section 15 is made up of an information signal reproducing section 15a, an address signal reproducing section 15b and a clock signal reproducing section 15c, and generates an information signal, an address signal and a clock signal by the reproducing sections 15a to 15c based on a reproducing signal outputted from the optical pickup 12.

The threshold value setting section 16, based on the reproducing signal outputted from the optical pickup 12, sets a threshold value in accordance with recording and reproducing conditions for the optical recording medium 1. The motor control section 17, based on the clock signal from the clock signal reproducing section 15c, controls the spindle motor 13.

Figure 4:
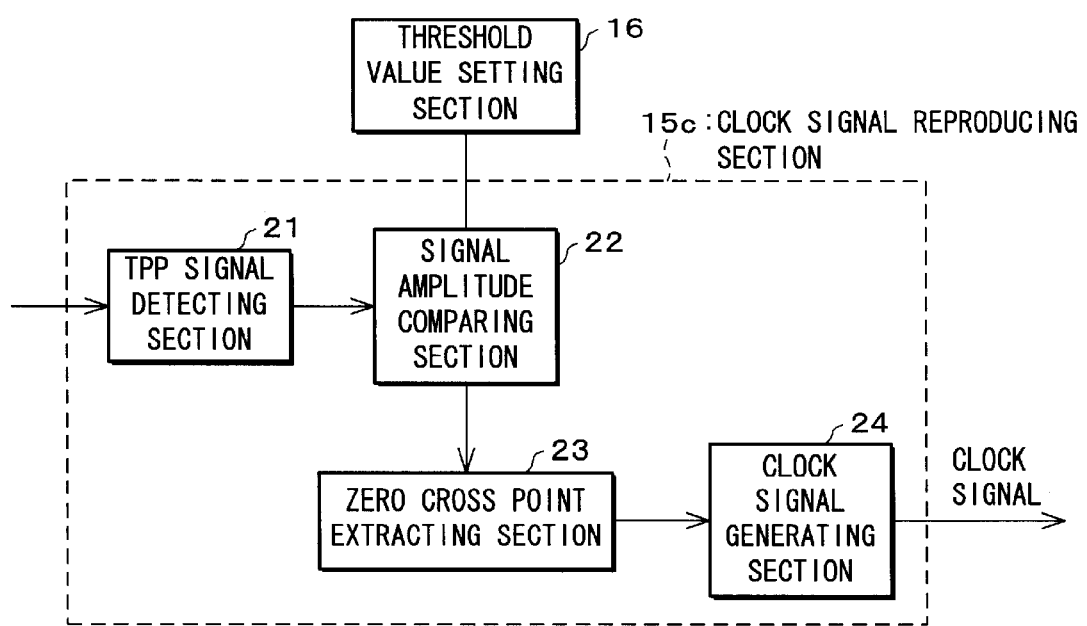
FIG. 4 is a block diagram showing an arrangement of a clock signal reproducing section shown in FIG. 3.

The above clock signal reproducing section 15c has an arrangement of FIG. 4. As shown in FIG. 4, the clock signal reproducing section 15c includes a TPP signal detecting section 21, a signal amplitude comparing section (control signal detecting means, control signal discriminating means) 22, a zero cross point extracting section 23 and a clock signal generating section (control signal generating means) 24.

The TPP signal detecting section 21 detects a TPP signal, i.e., the clock generating TPP signal OGC (OLC) and the address leakage signal OGA (OLA) from the reproducing signal outputted from the optical pickup 12. The signal amplitude comparing section 22 compares the amplitudes of the clock generating TPP signal OGC (OLC) and address leakage signal OGA (OLA) with the threshold value R. The zero cross point extracting section 23, as a result of comparison by the signal amplitude comparing section 22, extracts a zero cross point Z of a signal having a larger amplitude than the threshold value R, namely, the clock generating TPP signal OGC (OLC). The clock signal generating section 24 generates a clock signal based on the zero cross point Z thus extracted by the zero cross point extracting section 23.

Figure 5:
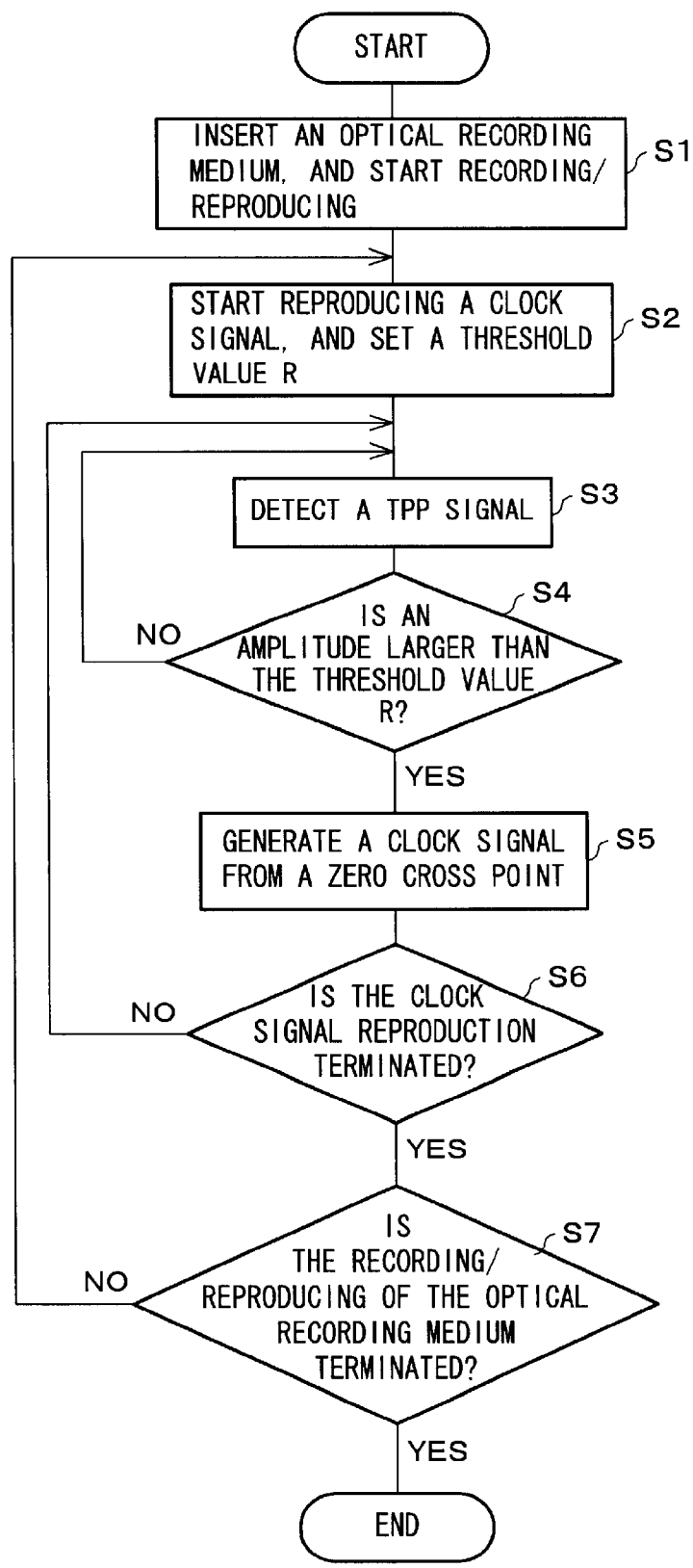
FIG. 5 is a flow chart showing the operation of generating a clock signal by the optical recording and reproducing device of FIG. 3.

The following will explain the operation of the optical recording and reproducing device 11 having the foregoing arrangement in terms of detection of a clock signal with reference to a flow chart of FIG. 5.

First of all, the optical recording medium 1 is inserted to the optical recording and reproducing device 11 so that the spindle motor 13 rotates it, thereby starting recording/reproducing by the optical pickup 12 (S1).

After thus starting recording/reproducing operation, the threshold value setting section 16 sets a threshold value R in accordance with recording and reproducing conditions as described later (S2).

Next, based on a reproducing signal from the optical pickup 12, the TPP signal detecting section 21 detects a TPP signal (S3).

Next, the signal amplitude comparing section 22 compares the threshold value R provided by the threshold value setting section 16 and the TPP signal detected by the TPP signal detecting section 21, thereby judging whether or not an amplitude of the TPP signal is larger than the threshold value R (S4).

As a result of the comparison, when the amplitude of the TPP signal is not larger than the threshold value R, it means that the TPP signal is not a clock generating TPP signal. Therefore, the zero cross point extracting section 23 does not extract a zero cross point of the TPP signal. However, when the amplitude of the TPP signal is larger than the threshold value R, it means that the TPP signal is the clock generating TPP signal. Therefore, the zero cross point extracting section 23 extracts a zero cross point of the TPP signal. Thereafter, the clock signal generating section 24 generates a clock signal based on the zero cross point thus extracted by the zero cross point extracting section 23 (S5).

Thereafter, the signal reproducing section 15 judges whether to terminate the operation of generating a clock signal (S6), and when the operation is continued, the sequence goes back to S3, thereby repeating the operation of S3 onward. However, when the operation is terminated, it is further judged whether or not the operation of recording/reproducing the optical recording medium 1 should be terminated (S7), and when the operation is continued, the sequence goes back to S2, thereby repeating the processes of S2 onward.

Figure 14:
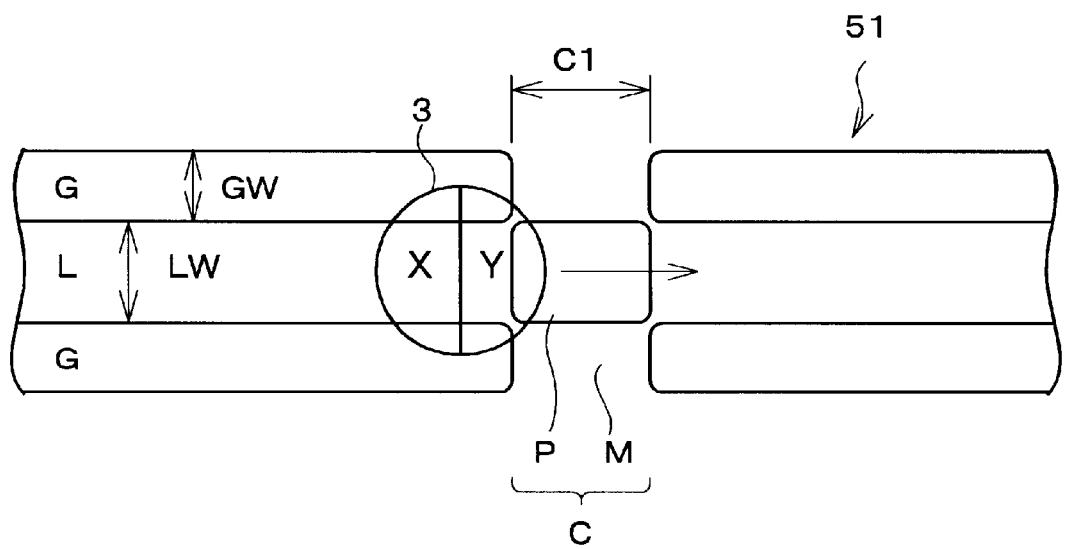
FIG. 14 is an explanatory view showing a main part of an optical recording medium according to another embodiment of the present invention, and in particular the respective forms of a land and grooves.

FIG. 14 shows an optical recording medium according to another embodiment of the present invention. The optical recording medium of FIG. 14 is made up, for example, of a magneto-optical recording medium. An optical recording medium 51 adopts a land recording system and has lands L and grooves G, of which the land L makes up a recording track. The lands L and the grooves G are alternately provide in the diameter direction of the disk-shaped optical recording medium 51, and a width LW of the land L is set larger than a width GW of the groove G.

In the optical recording medium 51, as with the optical recording medium 1, the land L includes an interrupted portion made up of the pit P as explained above, i.e., a clock mark (a control signal mark). In addition, the groove G includes an interrupted portion made up of the mirror mark portion M as explained above, i.e., a clock mark (a control signal mark).

In the case of generating a clock signal in the optical recording medium 51 having the foregoing arrangement, the center of the land L which is a track center is exposed to a laser beam, and reflection light is detected by photodetectors X and Y which are two halves of a photodetector divided in an emission direction of the laser beam, thereby obtaining a TPP signal (X-Y) of the same phase as that of a signal OLC shown in FIG. 2(b). Therefore, a zero cross point Z is extracted from the TPP signal (a first control signal), thereby generating a clock signal (a third control signal).

In this example above, explanation has been made through the case where the optical recording medium 51 is of a land recording system. However, the optical recording medium 51 may alternatively adopt a groove recording system. In the latter case, the recording track is made up of the groove G, and the width GW of the groove G is set larger than the width LW of the land L. In addition, the TPP signal and the clock signal can similarly be obtained, and the obtained TPP signal has the same phase as that of the signal OGC of FIG. 2(a).

Figure 15:
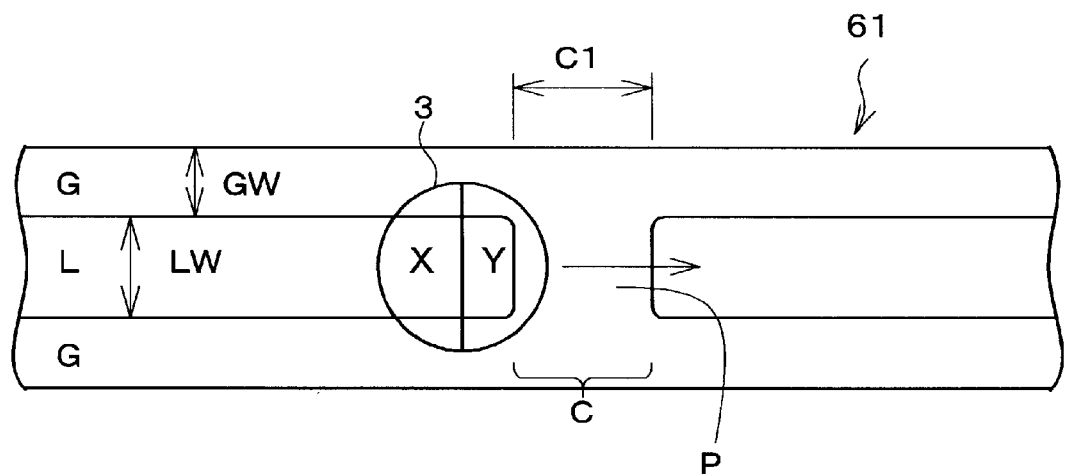
FIG. 15 is an explanatory view showing a main part of an optical recording medium according to still another embodiment of the present invention, and in particular the respective forms of a land and grooves.
Figure 16:
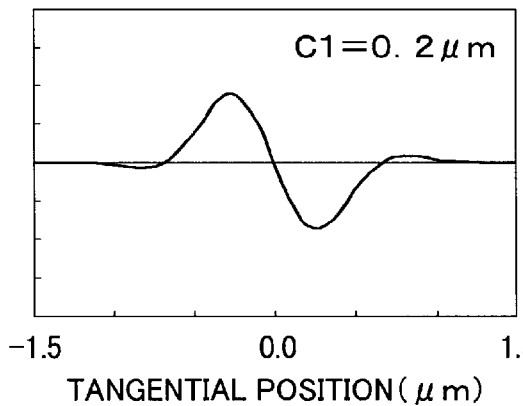
FIGS. 16(a) through 16(f) show TPP signals which are obtained by an optical pickup having a laser wavelength λ=655 nm and a numerical aperture NA=0.65, when changing a clock mark length of the optical recording medium of FIG. 14 according to still another example of the present invention. The respective clock mark lengths are 0.2 µm in FIG. 16(a), 0.4 µm in FIG. 16(b), 0.6 µm in FIG. 16(c), 0.8 µm in FIG. 16(d), 1.0 µm in FIG. 16(e), and 1.2 µm in FIG. 16(f).
Figure 16:
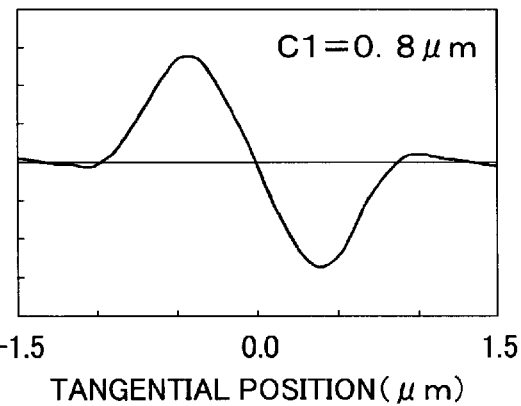
Figure 16:
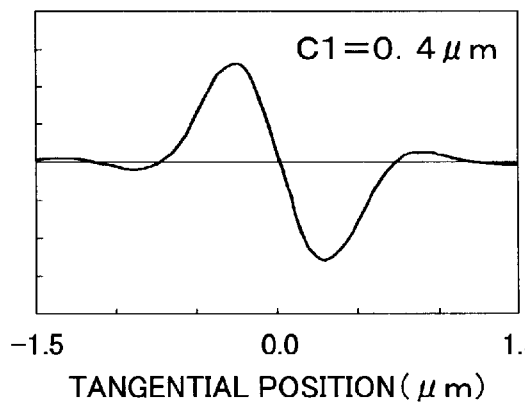
Figure 16:
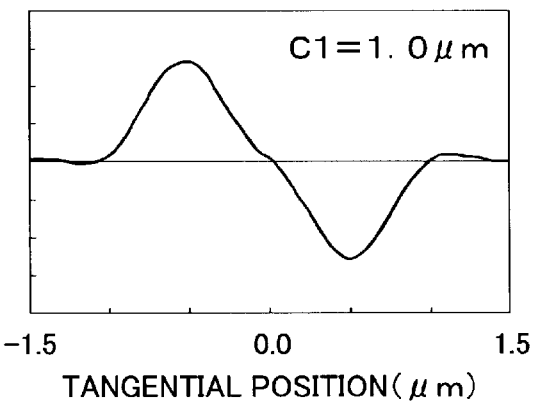
Figure 16:
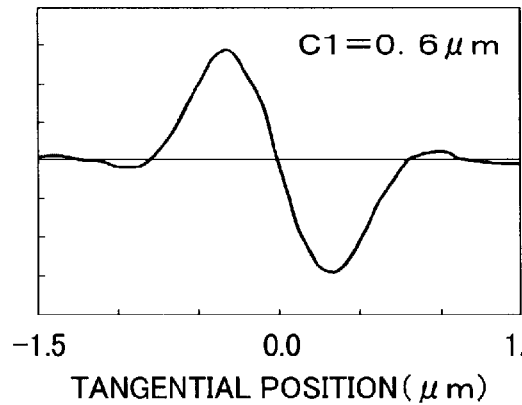
Figure 16:
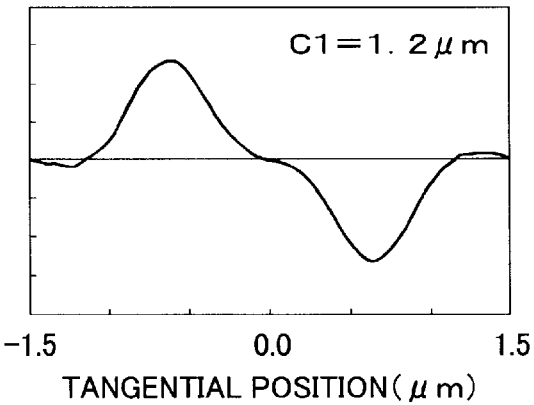

FIG. 15 shows an optical recording medium according to still another embodiment of the present invention. An optical recording medium 61 shown in FIG. 15 is, for example, a magneto-optical recording medium. The optical recording medium 61, as with the optical recording medium 51, adopts the land recording system and has lands L and grooves G, of which the land L makes up the recording track. The lands L and the grooves G are alternately provided in the diameter direction of the disk-shaped optical recording medium 61, where the width LW of the land L is set larger than the width GW of the groove G. In the optical recording medium 61, only the land L includes an interrupted portion, i.e., a clock mark (a control signal mark). The clock mark is made up of the pit P.

In the case where a clock signal is generated in the optical recording medium 61 having the foregoing arrangement, as with the case of the optical recording medium 51, the center of the land L which is a track center is exposed to a laser beam, and reflection light is detected by photodetectors X and Y, thereby obtaining a TPP signal (X-Y) of the same phase as that of the signal OLC shown in FIG. 2(b). Therefore, a zero cross point Z is extracted from the TPP signal (the first control signal), thereby generating a clock signal (a third control signal).

As explained, in the optical recording medium 61, an interrupted portion, i.e., a clock mark is set to be included in the land L that is the recording track. This arrangement has an advantage as explained below. When a clock mark is provided only in the groove G which is not the recording track, the TPP signal is obtained by reproducing a clock mark of an adjacent track, that reduces an amplitude of the obtained TPP signal. However, forming a clock mark in the land L allows the obtained TPP signal to have a large amplitude, thereby making it possible to surely generate a desirable clock signal.

In the above example, explanation has been made through the case where the optical recording medium 61 is of the land recording system. However, the optical recording medium 61 may alternatively adopt the groove recording system. In the latter case, the recording track is made up of the groove G, and the width GW of the groove G is set larger than the width LW of the land L. Accordingly, a TPP signal and a clock signal can similarly be obtained, and the obtained TPP signal has the same phase as that of the signal OGC shown in FIG. 2(a).

Next, the following will describe Examples of the optical recording media 1, 51 and 61, respectively.

EXAMPLE 1

In the present Example, the optical recording medium 1 was set to have the track width LW (GW) of 0.535 $\mu$m, and the groove G depth of 0.04 $\mu$m. The value of the track width LW (GW) was reduced as closest to a limit value enabling recording/reproducing by a beam spot as possible, the beam spot being generated by the optical pickup 12 that had a red semiconductor laser mounted thereon. Further, the value of the depth of the groove G was set so as to be compatible with laser wavelengths $\lambda$=655 nm and $\lambda$=410 nm. Details thereof will be discussed later.

Here, measured was the wavelength of a TPP signal obtained from the land L when a clock mark length C1 (see FIG. 1) provided in the optical recording medium 1 was changed from 0.2 $\mu$m to 1.2 $\mu$m. The optical pickup 12 adopted in that case had an arrangement in which the laser wavelength $\lambda$=655 nm, a numerical aperture NA=0.65, and a laser beam spot size D1=0.83 $\mu$m.

Note that, the clock mark length C1 is assumed to indicate the length of a clock mark in a track direction, the clock mark being positioned in the center of each of the land L and the groove G (the center of each of the track widths LW and GW). In the present embodiment, as shown in FIG. 1, the land L and the groove G are indicated as having a rectangular form. Alternatively, the land L and the groove G may further be arranged so that the rectangular land L and groove G are, for example, curved at edges (interrupted portions, etc.). Since the clock mark length C1 is thus defined, the present invention is applicable to the optical recording medium having the above arrangement.

FIGS. 6(a) through 6(f) show measurement results in the above case. The clock mark lengths C1 are 0.2 $\mu$m in FIG. 6(a), 0.4 $\mu$m in FIG. 6(b), 0.6 $\mu$m in FIG. 6(c), 0.8 $\mu$m in FIG. 6(d), 1.0 $\mu$m in FIG. 6(e) and 1.2 $\mu$m in FIG. 6(f). Here, the track width LW (GW) is set smaller than a beam spot D1.

It is understood from results shown in FIGS. 6(a) through 6(f) that, when the clock mark length C1 is increased, the waveform of a TPP signal is distorted at the zero cross point. Here, distortion is seen in FIGS. 6(e) and 6(f).

Figure 7:
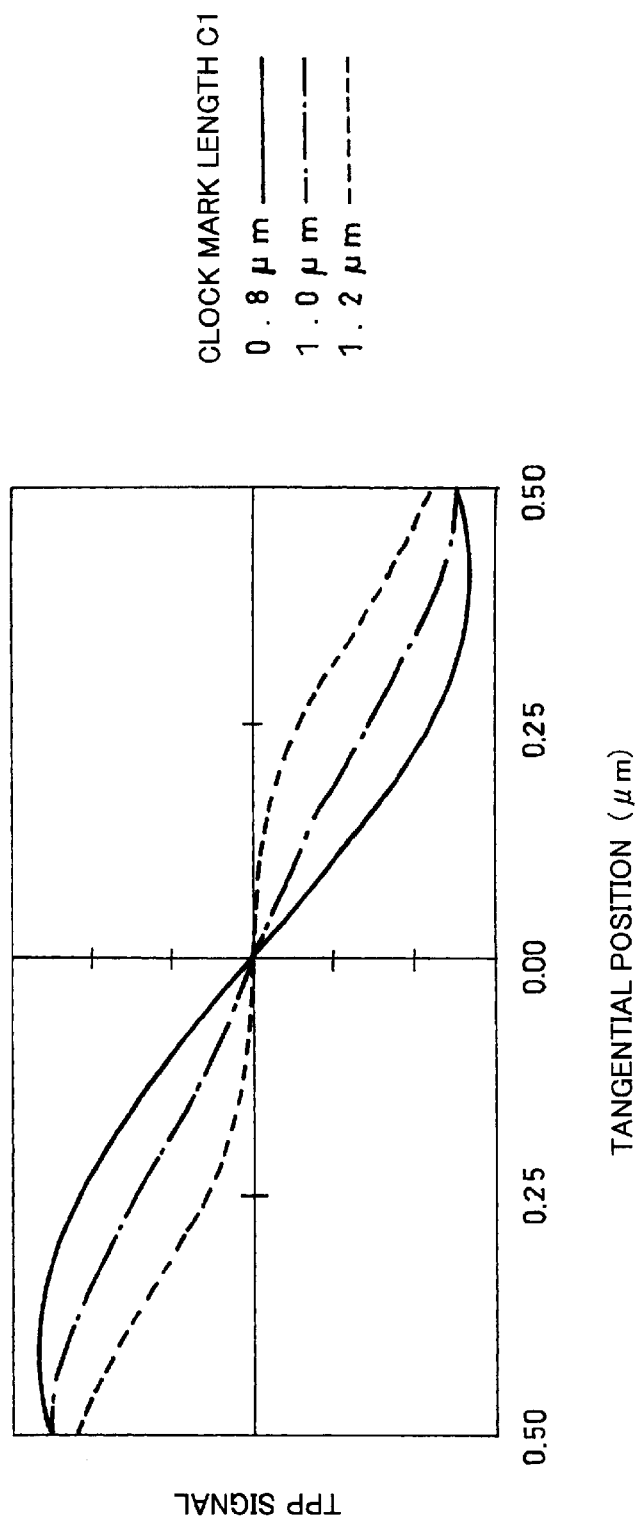
FIG. 7 is a magnified view showing waveforms of the TPP signals of FIGS. 6(d), 6(e) and 6(f) in the vicinity of a zero cross point.

Further, FIG. 7 shows a magnified view of the TPP signals of FIGS. 6(d), 6(e) and 6(f) in the vicinity of the zero cross point. It is clear from FIG. 7 that, when the clock mark length C1 is increased, distortion becomes large at the zero cross point.

When a clock generating TPP signal is distorted at the zero cross point, clock jitter increases. This results in a large error in the detection of a clock signal, that is not preferable. Therefore, the clock mark length C1 should be not more than a length which does not cause distortion in the waveform of a TPP signal.

Consequently, according to results shown in FIGS. 6(a) to 6(f) and 7, it is preferable that the clock mark length C1 is set smaller than the beam spot D1 (0.83 $\mu$m).

Figure 8:
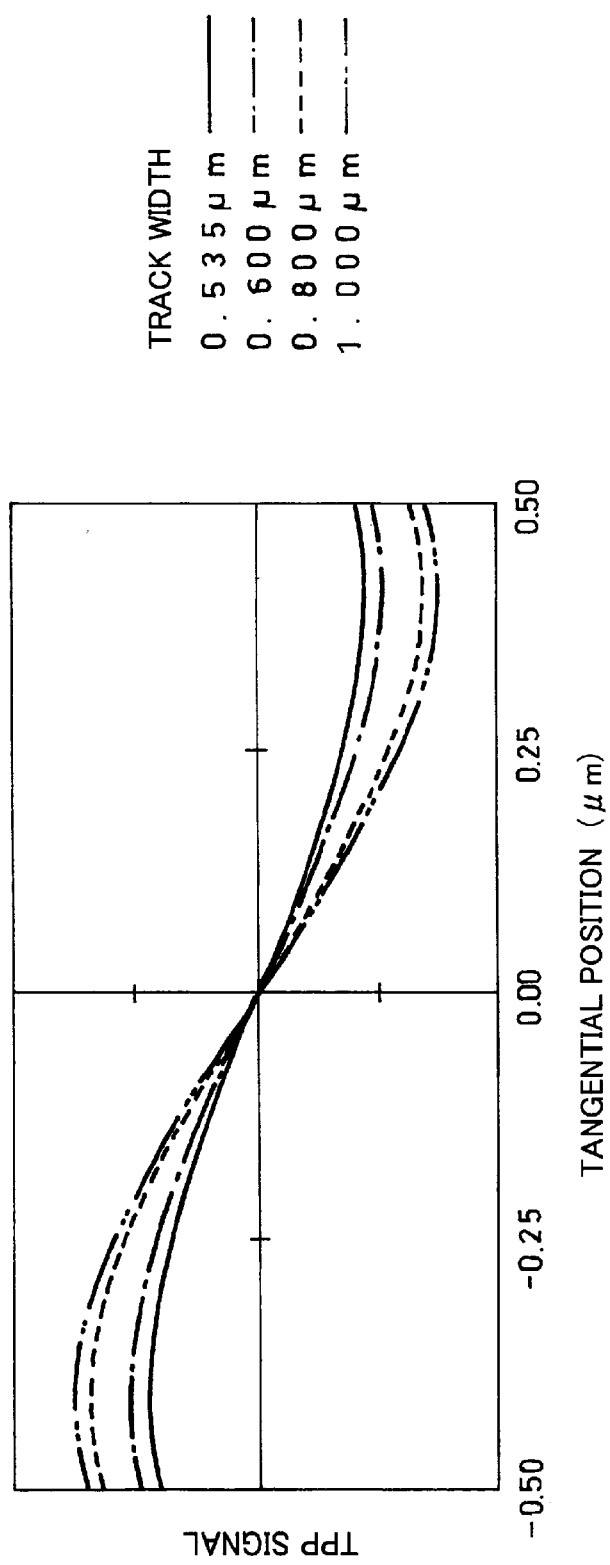
FIG. 8 is a magnified view showing waveforms of TPP signals in the vicinity of the zero cross point, which are obtained when setting a fixed clock mark length while changing a track width LW (GW) in the optical recording medium of FIG. 1.

Next, examined was the waveform of each TPP signal in the case where the clock mark length C1 is constant, and the track width LW (GW) is set to vary. FIG. 8 is a magnified view showing the TPP signals in the vicinity of the zero cross point that were obtained in the examination. The clock mark length C1 there was 0.8 μm. Further, as a range of the track width LW (GW) surely enabling recording/reproduction by the optical pickup 12 having a red semiconductor laser mounted thereon, a range between 0.535 μm and 1.00 μm was set.

It is understood from FIG. 8 that, when the track width LW (GW) varied, the amplitude of a TPP signal only varied, and distortion was not caused. In addition, though not shown, it is understood that, when the track width LW (GW) was caused to vary, the clock mark length C1 that was longer than the beam spot D1 caused distortion at the zero cross point as shown in FIGS. 6(e) and 6(f).

EXAMPLE 2

In the present Example, the optical recording medium 1 was set to have the track width LW (GW) of 0.535 μm and the groove G depth of 0.04 μm, and measured was the waveform of a TPP signal obtained from the land when the clock mark length C1 was caused to vary from 0.2 μm to 1.2 μm. In that case, the optical pickup 12 had an arrangement in which the laser wavelength λ=410 nm, a numerical aperture NA=0.65, and a beam spot size D1=0.52 μm.

Figure 9:
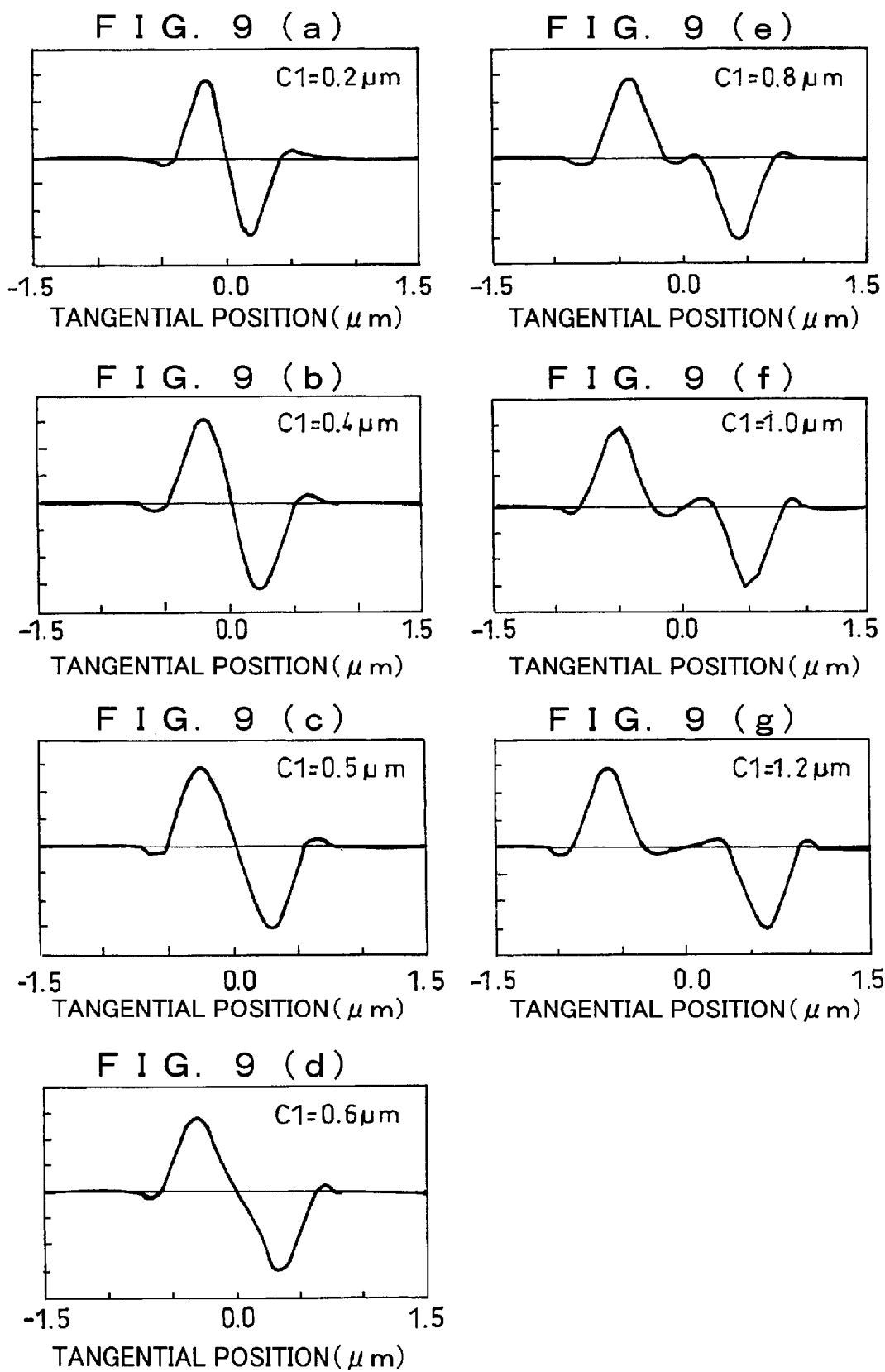
FIGS. 9(a) through 9(g) show TPP signals which are obtained by an optical pickup having a laser wavelength λ=410 nm and a numerical aperture NA=0.65, when changing the clock mark length of the optical recording medium of FIG. 1 according to another example of the present invention. The respective clock mark lengths are 0.2 μm in FIG. 9(a), 0.4 μm in FIG. 9(b), 0.5 μm in FIG. 9(c), 0.6 μm in FIG. 9(d), 0.8 μm in FIG. 9(e), 1.0 μm in FIG. 9(f), and 1.2 μm in FIG. 9(g).

FIG. 9 shows measurement results of the above case. The clock mark lengths C1 are 0.2 μm in FIG. 9(a), 0.4 μm in FIG. 9(b), 0.5 μm in FIG. 9(c), 0.6 μm in FIG. 9(d), 0.8 μm in FIG. 9(e), 1.0 μm in FIG. 9(f) and 1.2 μm in FIG. 9(g). Here, the track width LW (GW) is substantially the same as the beam spot size D1.

It is understood from the measurement results that the waveform of a TPP signal was distorted at the zero cross point in FIGS. 9(d) to 9(g), and distortion became large as the clock mark length C1 increased. As with Example 1, distortion at the zero cross point increases clock jitter, thereby resulting in a large error in the detection of a clock signal. Consequently, it is preferable that the clock mark length C1 is set smaller than the beam spot size D1 (0.52 μm).

Further, in the present Example, as a range of the track width LW (GW) enabling recording/reproduction by the optical pickup 12 that has a bluish purple semiconductor laser mounted thereon, a range between 0.335 μm and 0.627 μm was set. In addition, though not shown, as with Example 1, variation in the track width LW (GW) only caused the amplitude of a TPP signal to vary. Further, it is understood that, when the track width LW (GW) thus varied, the clock mark length C1 that was larger than the beam spot size D1 caused distortion at the zero cross point as shown in FIGS. 9(d) to 9(g).

EXAMPLE 3

In the present Example, the optical recording medium 51 was set to have the track width LW of 0.535 μm, the width GW of 0.250 μm, and the groove G depth of 0.04 μm. The width LW was set to be a value which enables desirable recording and reproduction in the land recording system.

Here, measured was the waveform of a TPP signal obtained from the land L when the clock mark length C1 (see FIG. 14) provided in the optical recording medium 51 was caused to vary from 0.2 μm to 1.2 μm. The optical pickup 12 adopted in that case had an arrangement in which the laser wavelength λ=655 nm, a numerical aperture NA=0.65, and a laser beam spot size D1=0.83 μm. Note that, the clock mark length C1 is assumed, as discussed, to indicate a length of a clock mark in the track direction, the clock mark being positioned in the center of the land L (the center of the track width LW).

FIGS. 16(a) through 16(f) show measurement results of the above case. The clock mark lengths C1 are 0.2 μm in FIG. 16(a), 0.4 μm in FIG. 16(b), 0.6 μm in FIG. 16(c), 0.8 μm in FIG. 16(d), 1.0 μm in FIG. 16(e) and 1.2 μm in FIG. 16(f). Here, the track width LW is smaller than the laser beam spot size D1.

It is understood from the measurement results that the waveform of a TPP signal was distorted at the zero cross point in FIGS. 16(e) and 16(f), and distortion became large as the clock mark length C1 increased. Consequently, as with the case of Example 1, it is preferable that the clock mark length C1 is set smaller than the beam spot size D1 (0.83 μm).

EXAMPLE 4

In the present Example, the optical recording medium 61 was set to have the track width LW of 0.535 μm, the width GW of 0.250 μm, and the groove G depth of 0.04 μm.

Here, measured was the waveform of a TPP signal obtained from the land L when the clock mark length C1 (see FIG. 15) provided in the optical recording medium 61 was caused to vary from 0.2 μm to 1.2 μm. The optical pickup 12 adopted in that case had an arrangement in which the laser wavelength λ=655 nm, a numerical aperture NA=0.65, and a laser beam spot size D1=0.83 μm. Note that, the clock mark length C1 is assumed, as discussed, to indicate a length of a clock mark in the track direction, the clock mark being positioned in the center of the land L (the center of the track width LW).

FIGS. 17(a) through 17(f) show measurement results of the above case. The clock mark lengths C1 are 0.2 μm in FIG. 17(a), 0.4 μm in FIG. 17(b), 0.6 μm in FIG. 17(c), 0.8 μm in FIG. 17(d), 1.0 μm in FIG. 17(e) and 1.2 μm in FIG. 17(f). Here, the track width LW is smaller than the laser beam spot size D1.

Figure 17A:
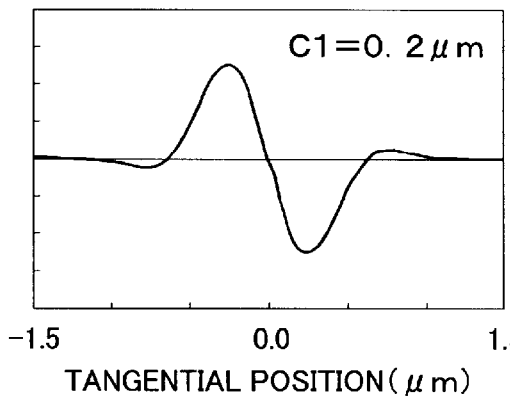
FIGS. 17(a) through 17(f) show TPP signals which are obtained by an optical pickup having a laser wavelength λ=655 nm and a numerical aperture NA=0.65, when changing a clock mark length of the optical recording medium of FIG. 15 according to still another example of the present invention. The respective clock mark lengths are 0.2 µm in FIG. 17(a), 0.4 µm in FIG. 17(b), 0.6 µm in FIG. 17(c), 0.8 µm in FIG. 17(d), 1.0 µm in FIG. 17(e), and 1.2 µm in FIG. 17(f).
Figure 17D:
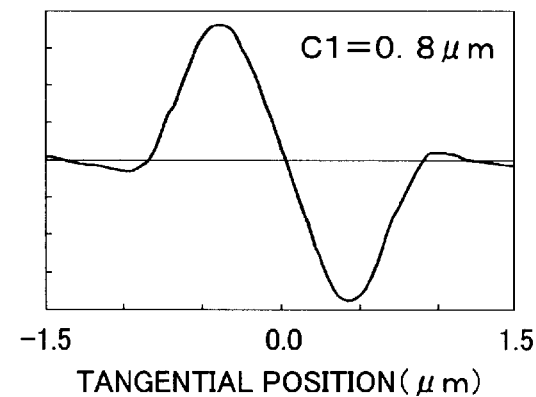
Figure 17B:
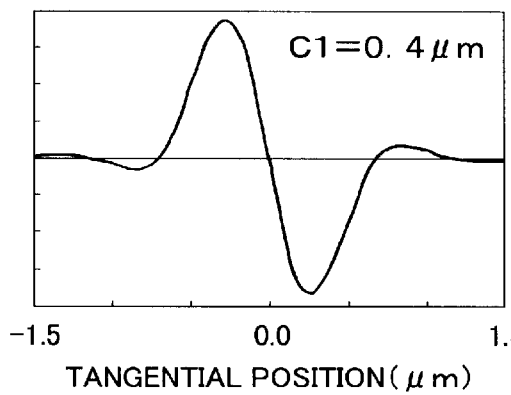
Figure 17E:
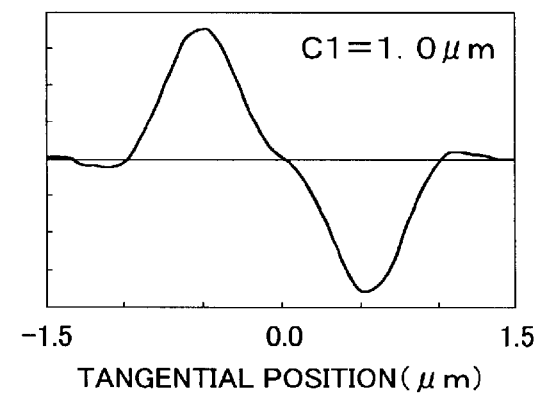
Figure 17C:
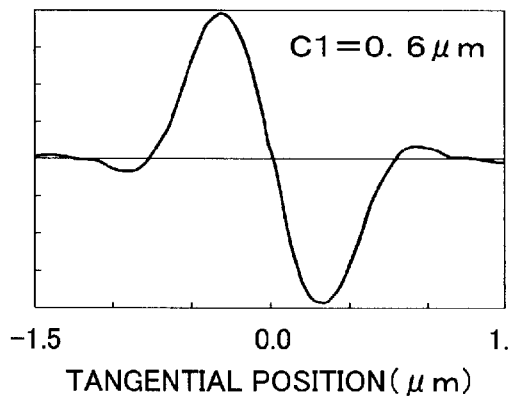
Figure 17F:
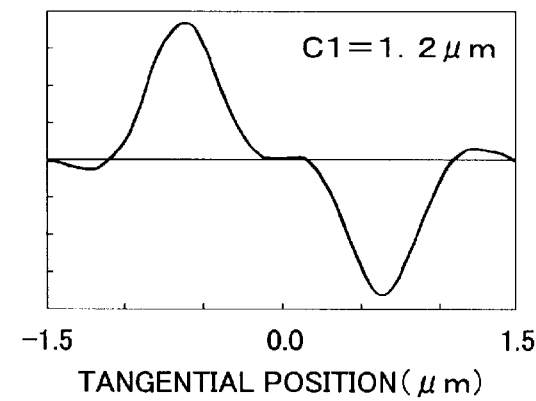

It is understood from the measurement results that the waveform of a TPP signal was distorted at the zero cross point in FIGS. 17(e) and 17(f), and distortion became large as the clock mark length C1 increased. Consequently, as with the case of Example 1, it is preferable that the clock mark length C1 is set smaller than the beam spot size D1 (0.83 μm).

EXAMPLE 5

In the present Example, the optical recording medium 51 was set to have the track width LW of 0.535 μm, the width GW of 0.250 μm, and the groove G depth of 0.04 μm.

Here, measured was the waveform of a TPP signal obtained from the land L when the clock mark length C1 (see FIG. 14) provided in the optical recording medium 51 was caused to vary from 0.2 μm to 1.2 μm. The optical pickup 12 adopted in that case had an arrangement in which the laser wavelength λ=410 nm, a numerical aperture NA=0.65, and a laser beam spot size D1=0.52

FIGS. 18(a) through 18(g) show measurement results of the above case. The clock mark lengths C1 are 0.2 μm in FIG. 18(a), 0.4 μm in FIG. 18(b), 0.5 μm in FIG. 18(c), 0.6 μm in FIG. 18(d), 0.8 μm in FIG. 18(e), 1.0 μm in FIG. 18(f) and 1.2 μm in FIG. 18(g). Here, the track width LW is substantially the same as the beam spot size D1.

It is understood from the measurement results that the waveform of a TPP signal was distorted at the zero cross point in FIGS. 18(d) to 18(g), and distortion became large as the clock mark length C1 increased. Consequently, as with Example 1, it is preferable that the clock mark length C1 is set smaller than the beam spot size D1 (0.52 μm).

EXAMPLE 6

In the present Example, the optical recording medium 61 was set to have the track width LW of 0.535 μm, the width GW of 0.250 μm, and the groove G depth of 0.04 μm.

Here, measured was the waveform of a TPP signal obtained from the land L when the clock mark length C1 (see FIG. 15) provided in the optical recording medium 61 was caused to vary from 0.2 μm to 1.2 μm. The optical pickup 12 adopted in that case had an arrangement in which the laser wavelength λ=410 nm, a numerical aperture NA=0.65, and a laser beam spot size D1=0.52 μm.

FIGS. 19(a) through 19(g) show measurement results of the above case. The clock mark lengths C1 are 0.2 μm in FIG. 19(a), 0.4 μm in FIG. 19(b), 0.5 μm in FIG. 19(c), 0.6 μm in FIG. 19(d), 0.8 μm in FIG. 19(e), 1.0 μm in FIG. 19(f) and 1.2 μm in FIG. 19(g). Here, the track width LW is substantially the same as the beam spot size D1.

It is understood from the measurement results that the waveform of a TPP signal was distorted at the zero cross point in FIGS. 19(d) to 19(g), and distortion became large as the clock mark length C1 increased. Consequently, as with Example 1, it is preferable that the clock mark length C1 is set smaller than the beam spot size D1 (0.52 μm).

The results of Examples 1 and 2 above showed the case where the beam spot sizes D1 were 0.83 μm (for example, the spot size of red laser light) and 0.52 μm (for example, the spot size of bluish purple laser light). However, it is made clear that, in the case of adopting any beam spot size D1 and track width LW (GW), setting the clock mark length C1 smaller than the beam spot size D1 prevents the waveform of a TPP signal from being distorted at the zero cross point.

Further, Examples 4 and 6 above showed the case where a clock mark is included only in the land L in the land recording system. It is made clear from the measurement results that, even in the case of the land recording system, setting the clock mark length C1 smaller than the beam spot size D1 prevents the waveform of a TPP signal from being distorted at the zero cross point.

Examination of A Relationship between the Beam Spot Size D1 and the Clock Mark Length C1

Next, the following will explain the results of an examination of a relationship between the beam spot size D1 and the clock mark length C1.

Figure 10:
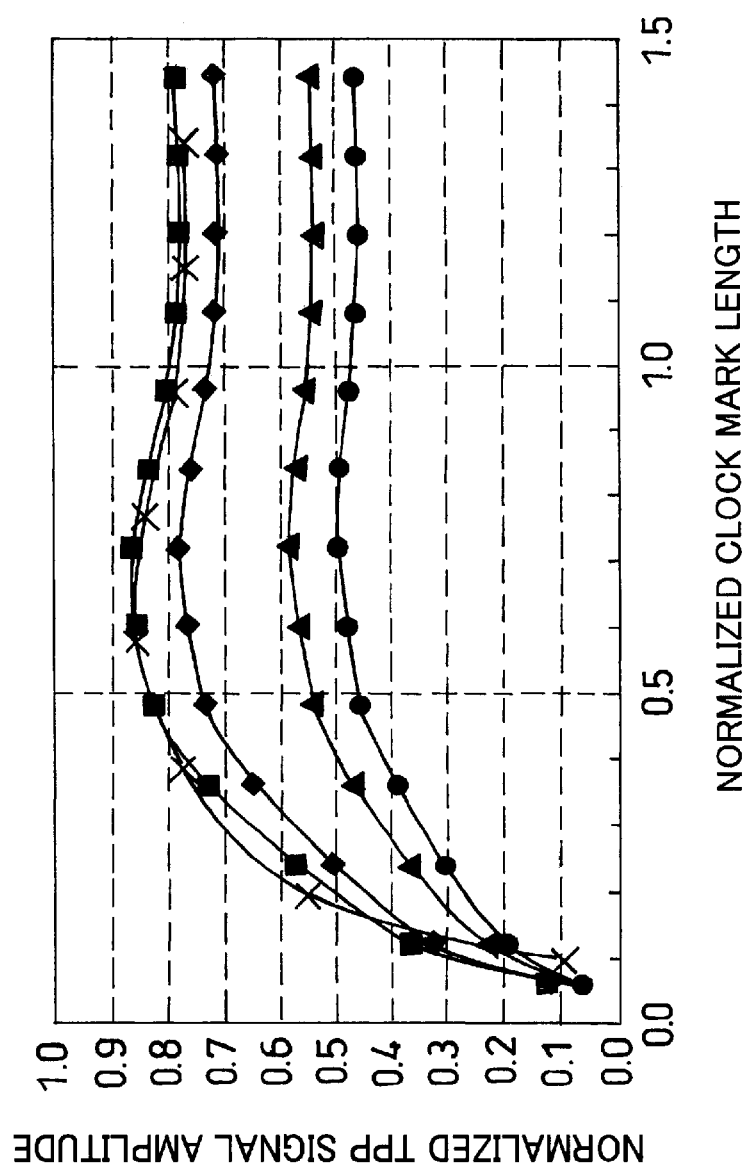
FIG. 10 is a graph showing a relationship between a normalized clock mark length and a normalized TPP signal amplitude when changing a track width by an optical pickup having a wavelength λ=655 nm and a numerical aperture NA=0.65, and an optical pickup having a wavelength λ=410 nm and a numerical aperture NA=0.65 in the optical recording medium of FIG. 1.

FIG. 10 shows the results of an examination of a relationship between a normalized clock mark length and a normalized TPP signal amplitude. Here, the normalized clock mark length (CM) is defined as a clock mark length C1 with respect to the beam spot size D1. More specifically, it is defined as follows:

a normalized clock mark length=a clock mark length C1/a beam spot size D1.

Further, the normalized TPP signal amplitude is a TPP signal amplitude which is normalized by a sum signal obtained from the optical recording medium 1, and is defined as a TPP signal amplitude with respect to the sum signal obtained from a mirror mark portion M. More specifically, it is defined as follows:

a normalized signal amplitude=a TPP signal amplitude/a sum signal obtained from the mirror mark portion M.

Note that, the sum signal obtained from the mirror mark portion M is a signal obtained from a photodetector due to a laser beam reflected at the mirror mark potion M of the optical recording medium 1.

Further, in the present examination, a track width LW (GW) was caused to vary by using the optical pickup 12 of Example 1 (hereinafter referred to as a "first optical pickup 12a") in which a wavelength λ=655 nm, a beam spot size D1=0.83 μm, and a numerical aperture NA=0.65, and the optical pickup 12 of Example 2 (hereinafter referred to as a "second optical pickup 12b") in which a wavelength λ=410 nm, a beam spot size D1=0.52 μm, and a numerical aperture NA=0.65.

It is clear from FIG. 10 that variation in the track width LW (GW) only causes variation in the normalized TPP signal amplitude.

Next, examined were a value of the normalized TPP signal amplitude in the vicinity of a maximum value and a normalized clock mark length at that time in the case where the first optical pickup 12a was used. Table 1 shows the examination results. Note that, values underlined in Table 1 are the maximum values of the normalized TPP signal amplitude.

TABLE 1

| NORMALIZED CLOCK MARK LENGTH | NORMALIZED TPP SIGNAL λ = 655 nm | | | |
|---|---|---|---|---|
| | TRACK WIDTH 0.535 μm | TRACK WIDTH 0.600 μm | TRACK WIDTH 0.800 μm | TRACK WIDTH 1.000 μm |
| 0.60 | 0.477 | 0.564 | 0.768 | 0.857 |
| 0.66 | 0.490 | 0.580 | 0.781 | 0.868 |
| 0.72 | 0.497 | 0.585 | 0.782 | 0.865 |
| 0.84 | 0.490 | 0.573 | 0.761 | 0.835 |
| 0.96 | 0.475 | 0.554 | 0.734 | 0.804 |

It is clear from Table 1 that, in the case where the track width LW (GW) was caused to vary from 0.535 μm to 1.00 μm, the normalized TPP signal amplitude shows maximum values within a range of the normalized clock mark length between 0.66 and 0.72. Therefore, it is understood that setting the normalized clock mark length within that range made it possible to surely obtain a desirable clock signal.

Further, in the case where the second optical pickup 12b was used, though not shown in Tables, it is understood that, when the track width LW (GW) was caused to vary from 0.335 μm to 0.627 μm, the normalized TPP signal amplitude shows maximum values within the range of the normalized clock mark length between 0.66 and 0.72, and in that range was attained a desirable clock signal.

From the foregoing results, it is possible to obtain a clock generating TPP signal free from distortion. As a result, in order to generate a clock signal causing little jitter, it is preferable to set a normalized clock mark length (CM) at 1.0 or less (to set the clock mark length C1 at not more than the beam spot size D1), that is, $CM \leq 1.0$.

Further, in order to generate a desirable clock signal by increasing an amplitude of the TPP signal to be detected, it is preferable to set the normalized clock mark length (CM) as $0.66 \leq CM \leq 0.72$.

Further, in order to attain facilities as above, when considering compatibility with laser beams of wavelengths λ1 and λ2 (λ1>λ2), for example, the compatibility in the case of using the optical pickup 12a having the red semiconductor laser mounted thereon and in the case of using the optical pickup 12b having the bluish purple semiconductor laser mounted thereon, a preferable range of the clock mark length C1 is given as:

$$0.66 \times D2 \leq C1 \leq 0.72 \times D1,$$

where D1 is a laser spot size of the laser light having the wavelength λ1, and D2 is a laser spot size of the laser light having the wavelength λ2.

Here, in the case where the spot size of red laser light is 0.83 μm, and the spot size of bluish purple laser light is 0.52 μm, a preferable range of the clock mark length C1 is given as $0.34 \leq C1 \leq 0.52$.

Examination of the Depth of the Groove G

Next, the following will explain examination results concerning the depth of the groove G.

Figure 11:
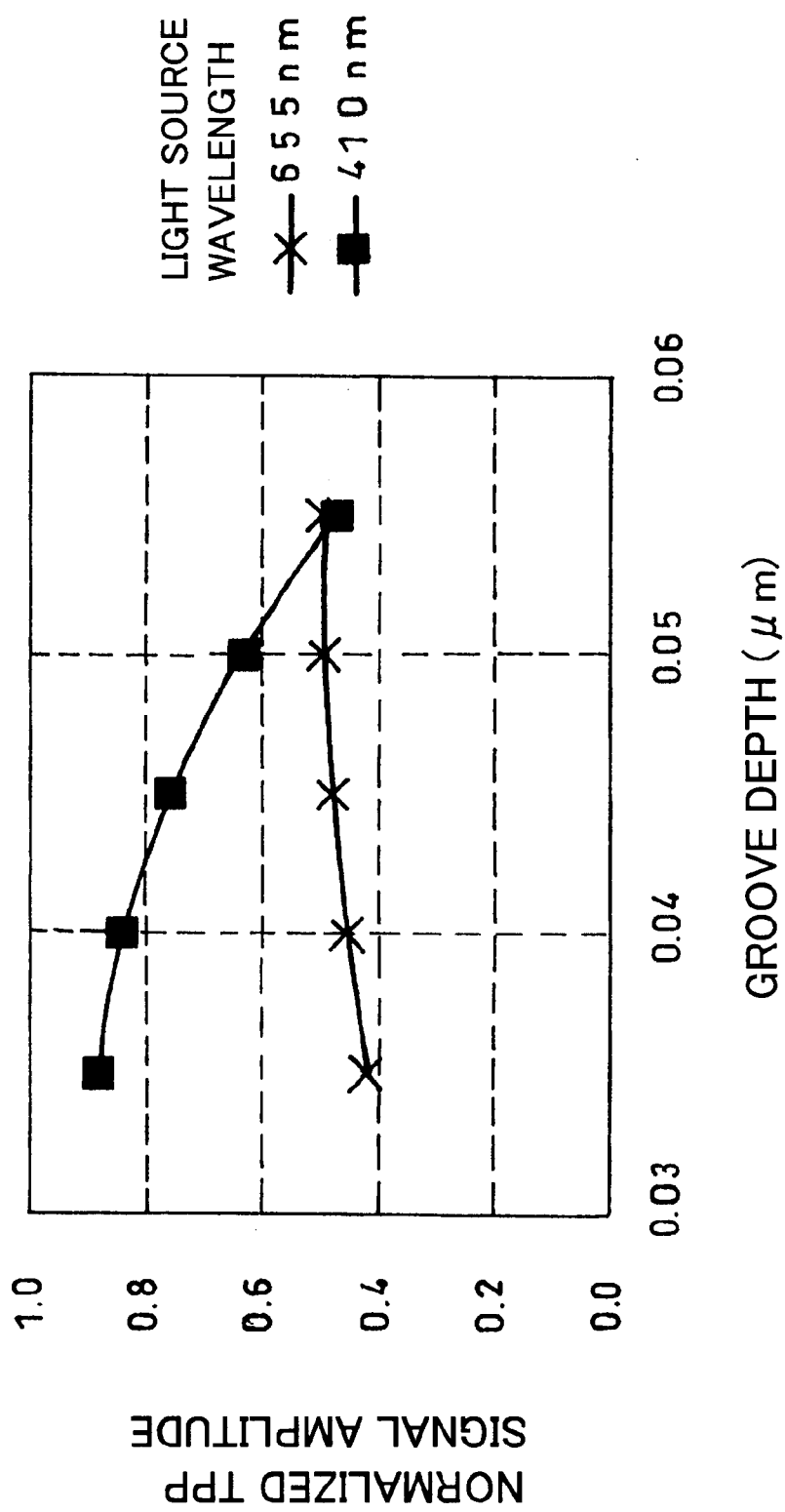
FIG. 11 is a graph showing a relationship between a groove depth and a normalized TPP signal amplitude when using the optical pickup having a wavelength λ=655 nm and a numerical aperture NA=0.65, and the optical pickup having a wavelength λ=410 nm and a numerical aperture NA=0.65 in the optical recording medium of FIG. 1.

FIG. 11 shows the results of an examination in which examined was a normalized TPP signal amplitude when the depth of the groove G was caused to vary so as to perform reproduction by the first and second optical pickups 12a and 12b. In that case, the clock mark length C1 was set at 0.40 μm. This value of the clock mark length C1 does not cause distortion in the waveform of a TPP signal when using either of the first optical pickup 12a (the wavelength λ=655 nm, and the beam spot size D1=0.83 μm) and the second optical pickup 12b (the wavelength λ=410 nm, and the beam spot size D1=0.52 μm).

From the examination results, it is understood that, when the first optical pickup 12a was used, the normalized TPP signal amplitude hardly varied when the depth of the groove G is in a range between 0.035 μm and 0.055 μm. On the other hand, it is understood that, when the second optical pickup 12b was used, the normalized TPP signal amplitude was reduced as the depth of the groove G increased.

Further, when the first optical pickup 12a was used, the normalized TPP signal amplitude was reduced when the depth of the groove G was smaller than 0.035 μm, thereby making it difficult to detect a signal. When the second optical pickup 12b was used, and for example, when a silicon photodiode was used as a photodetector, the sensitivity of a light receiving portion becomes low due to quantum efficiency. Therefore, it is desirable to detect a signal with such depth of the groove G as to increase the normalized TPP signal amplitude as much as possible.

The examination results above show that setting the depth of the groove G within a range between 0.035 μm and 0.040 μm makes it possible to obtain the normalized TPP signal amplitude necessary for the detection of a signal by using either of the first and second optical pickups 12a and 12b, i.e., the optical pickup 12a having the red semiconductor laser and the optical pickup 12b having the bluish purple semiconductor laser. Further, in the case of using the first optical pickup 12a, even when the depth of the groove G fluctuates, variation in the normalized TPP signal amplitude is small, thereby enabling the stable detection of a signal.

Figure 12:
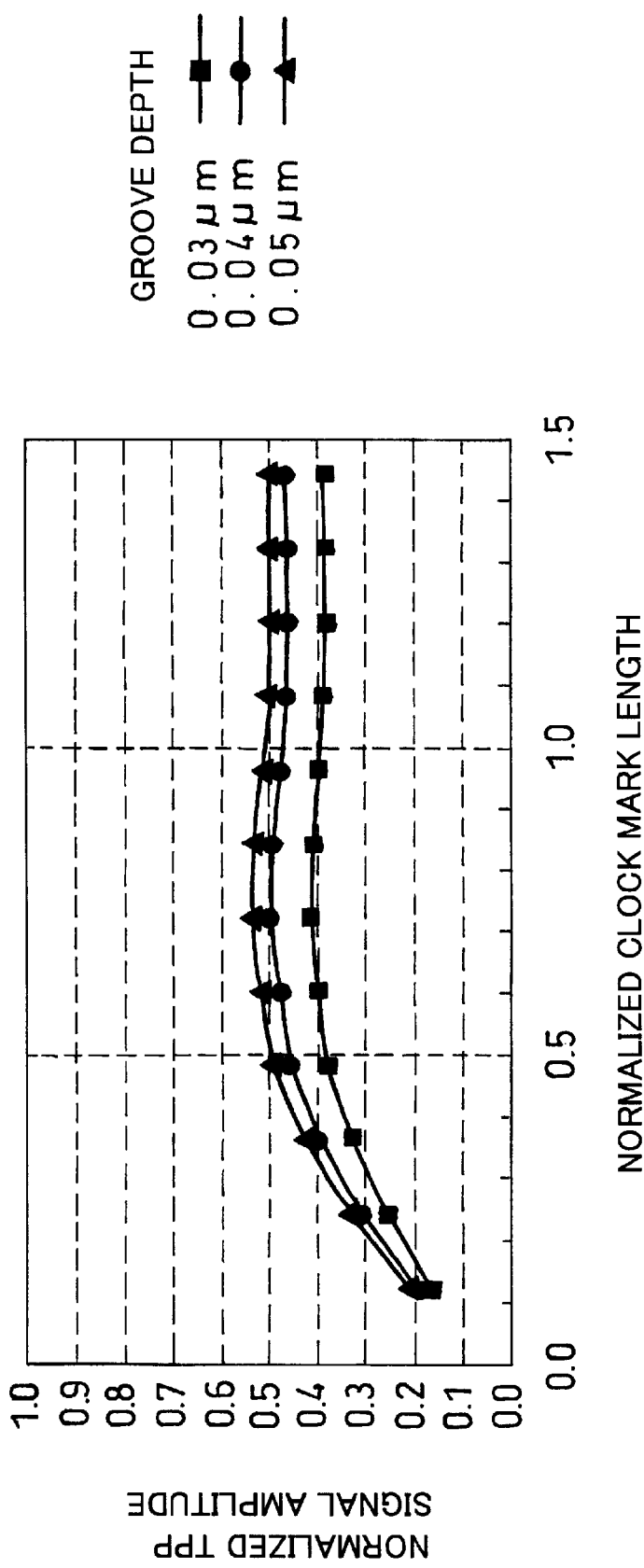
FIG. 12 is a graph showing a relationship between a normalized clock mark length and a normalized TPP signal amplitude when setting a track width at 0.535 μm while changing a groove depth by an optical pickup having a wavelength λ=655 nm, a beam spot size D1=0.83 µm and a numerical aperture NA=0.65 in the optical recording medium of FIG. 1.

Next, the first optical pickup 12a (the beam spot size D1=0.83 μm, and the numerical aperture NA=0.65) was used to examine a relationship between the normalized clock mark length and the normalized TPP signal amplitude in the case where the track width was set at 0.535 μm, and the depth of the groove G was caused to vary. FIG. 12 shows the examination results.

It is understood from FIG. 12 that variation in the depth of the groove G only caused variation in the normalized TPP signal amplitude. In that case, as with the examination results shown in FIG. 10, the normalized TPP signal amplitude showed its maximum value when the normalized clock mark length was around 0.7. Consequently, again, it is preferable that the normalized clock mark length is set in a range between 0.66 and 0.72.

As explained, according to the results shown in FIGS. 10 and 12, and Table, it is understood that the normalized clock mark length should be not more than 1.0 so as to generate a TPP signal without large distortion in amplitude.

Furthermore, in order to surely generate a desirable TPP signal, the normalized clock length when the normalized TPP signal amplitude is maximum should be selected. The normalized clock mark length when the normalized TPP signal amplitude is maximum is substantially the same in either of the following cases: when the track width LW (GW) varied; when the depth of the groove G varied; and when the beam spot size D1 varied. In the present Example, the normalized clock mark length when the normalized TPP signal amplitude is maximum is in a range between 0.66 and 0.72.

Further, the maximum limit value (=1.0) and the optimum value (0.66–0.72) of the normalized clock mark length are applicable to an optical recording medium in which a wobbles 2 are not formed and an optical recording medium in which the wobbles 2 are formed on both sides.

Effects of an Address Leakage Signal Next, effects that an address leakage signal has on a clock generating TPP signal were examined. Results of the examination will be explained with reference to FIGS. 1, 2(a), 2(b), 10 and 13.

As shown in FIG. 1, the optical recording medium 1 includes a wobble (one-side wobble) 2 recording an address on one of the side walls of the groove G. The wobble 2 has an amplitude A2 of 0.180 μm and the length A3 of one period that is 1.448 μm, and makes up an address region A. Here, it is assumed that the address region A is reproduced by the first optical pickup 12a (the wavelength λ=655 nm, and the numerical aperture NA=0.65).

As shown in FIG. 2(a) for example, the amplitude of a clock generating TPP signal OGC, if not particularly made larger than the amplitude of an address leakage signal OGA, cannot be discriminated from the address leakage signal OGA. This also applies to a relationship between a clock generating TPP signal OLC and an address leakage signal OLA shown in FIG. 2(b).

Accordingly, in order to detect the clock generating TPP signal OGC without being affected by the address leakage signal OGA, a threshold value R should be set larger than the amplitude of the normalized address leakage signal, and a clock mark length C1 of the optical recording medium 1 should be set so that a clock generating TPP signal having an amplitude which is not less than the threshold value R is outputted.

Note that, the normalized address leakage signal has a value normalized by a sum signal which is obtained in the mirror mark portion M of the optical recording medium 1 and is defined as an address leakage signal with respect to the sum signal obtained from the mirror mark portion M. Namely, it is defined as a normalized address leakage signal=an address leakage signal/a sum signal obtained from the mirror mark portion M.

Figure 13:
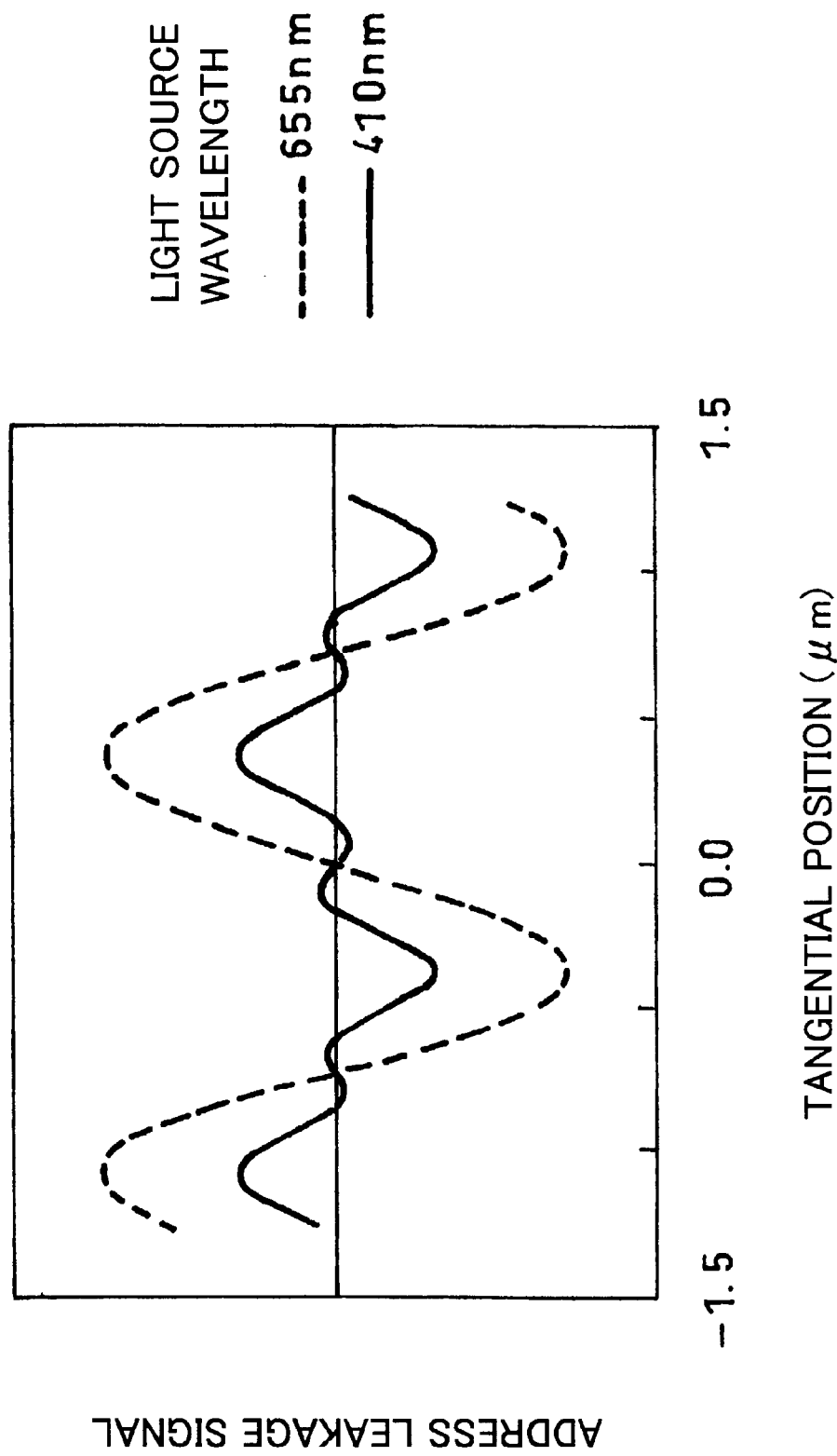
FIG. 13 is a waveform diagram showing address leakage signals which emerge in an address region when using an optical pickup having a wavelength λ=655 nm and a beam spot size=0.83 µm, and an optical pickup having a wavelength λ=410 nm and a beam spot size=0.52 µm to reproduce the optical recording medium of FIG. 1.

FIG. 13 shows the waveforms of address leakage signals which emerged in the address region A in the case of reproducing the optical recording medium 1 by the first optical pickup 12a (the beam spot size D1=0.83 μm) and the second optical pickup 12b (the beam spot size D1=0.52 μm). In that case, the optical recording medium 1 was set to have an arrangement in which the track width LW (GW) was 0.535 μm; the amplitude of the wobble 2 was 0.180 μm; and the clock mark length C1 was 0.40 μm, i.e., the clock mark length to cause no distortion in the waveform of a TPP signal in the case of using either of the first and second optical pickups 12a and 12b.

The amplitudes of the address leakage signals above given as normalized address leakage signal amplitudes are 0.144 when the first optical pickup 12a is used, which is about 32% of the normalized TPP signal amplitude, and 0.061 when the second optical pickup 12b is used, which is about 7% of the normalized TPP signal amplitude.

In order to surely perform recording and reproducing of the optical recording medium 1, it is crucial to surely detect a clock signal even when variation occurs in the beam spot size D1, the amplitude A2 of the wobble 2 in the address region A, or the track width LW (GW). Therefore, in order to enable the detection of a clock generating TPP signal by either of the first and second optical pickups 12a and 12b, it is necessary that a threshold value R be set larger than 0.144 that is the amplitude of the normalized address leakage signal detected by the first optical pickup 12a.

Furthermore, in order to allow a sufficient margin in level, it is preferable that the threshold value R is set at a value which is 20% larger than the value of the amplitude of the normalized address leakage signal. By thus setting the threshold value R, it is possible to surely discriminate between the clock generating TPP signal and the address leakage signal, thereby preventing an adverse effect of the address leakage signal.

Table 2 below shows results of an examination in which examined were the amplitude of the normalized address leakage signal obtained for each track width LW (GW) as above, and a threshold value R in that case, and a normalized clock mark length to obtain that threshold value R.

TABLE 2

| TRACK WIDTH (μm) | NORMALIZED ADDRESS LEAKAGE SIGNAL AMPLITUDE | THRESHOLD VALUE | NORMALIZED CLOCK MARK LENGTH |
|---|---|---|---|
| 0.535 | 0.144 | 0.173 | 0.11 |
| 0.600 | 0.122 | 0.146 | 0.09 |
| 0.800 | 0.059 | 0.071 | 0.05 |
| 1.000 | 0.019 | 0.023 | 0.03 |

The results shown in Table 2 indicate that, a threshold value R is 0.173 in the case where the maximum value is adopted so that a clock signal can surely be obtained even when a track width LW (GW) varies. In addition, a normalized clock mark length in that case is 0.11. When the normalized clock mark length becomes smaller than 0.11, a clock generating TPP signal amplitude is reduced to substantially the same as the amplitude of the address leakage signal, or becomes smaller than the amplitude of the address leakage signal. In that case, it is very likely that the clock generating TPP signal cannot be discriminated from the address leakage signal.

Next, an address leakage in the optical recording medium 1 having the track width LW (GW) of 0.335 μm in the case where the beam spot size D1 is 0.52 μm will be examined.

The amplitude of the wobble 2 in the optical recording medium 1 is 0.113 μm in the case where it is set by the same ratio as that of the wobble 2 in the optical recording medium 1 having the beam spot size D1 of 0.83 μm, the track width of 0.535 μm, and the wobble 2 amplitude of 0.180 μm. Further, the clock mark length C1 is set at 0.1 μm. Note that, a clock mark length C1 which is shorter than 0.1 μm is considered hard to be formed.

In that case, the amplitude of a normalized address leakage signal is 0.122, which is about 37% of a normalized TPP signal amplitude. The threshold value R in that case, though not show in Tables, is preferably set at a value which is 20% larger than the amplitude of the normalized address leakage signal, and the threshold value R thus set is 0.146. Further, a normalized clock mark length (CM) when obtaining a normalized TPP signal which is not less than that threshold value R is 0.11. Consequently, in that case, taking into consideration the maximum limit value (CM≦1.0) of the normalized clock mark length (CM) above, $$0.11 \leq CM \leq 1.0.$$

As discussed, even when the beam spot size D1 for use in recording and reproduction varied, in the case where a track width LW (GW) is within such a range that can be recorded and/or reproduced with that beam spot size D1, a normalized TPP signal amplitude which is larger than the amplitude of the normalized address leakage signal can be obtained by setting the normalized clock mark length at 0.11 or more. As a result, it is possible to surely detect a clock generating TPP signal without being affected by the address leakage signal, thereby enhancing reliability.

Further, in order to attain facilities as above, when considering compatibility with laser beams of wavelengths λ1 and λ2 (λ1>λ2), for example, the compatibility in the case of using the optical pickup 12a having the red semiconductor laser mounted thereon and in the case of using the optical pickup 12b having the bluish purple semiconductor laser mounted thereon, an optimum range of the clock mark length C1 is given as:

$$0.11 \times D1 \leq C1 \leq D2,$$

where D1 is a laser spot size of the laser light having the wavelength λ1, and D2 is a laser spot size of the laser light having the wavelength λ2.

Here, in the case where the spot size of red laser light is 0.83 μm, and the spot size of bluish purple laser light is 0.52 μm, an optimum range of the clock mark length C1 is given as $0.09 \leq C1 \leq 0.52$.

Note that, in order to more surely obtain the normalized TPP signal amplitude that is larger than the amplitude of the normalized address leakage signal, the normalized clock mark length should be of a range between 0.66 and 0.72 as above.

Further, explanation has been made through the case where the amplitude of the wobble 2 was set at 0.180 μm when the track width was 0.535 μm or 0.113 μm when the track width was 0.335 μm. Nevertheless, if the amplitude of the wobble 2 is set smaller, the amplitude of the address leakage signal is reduced, thereby allowing a sufficient margin in the setting of a threshold value R. Further, when the threshold value R can be set small, the amplitude of the clock generating TPP signal can also be made smaller, thereby reducing the clock mark length C1. As a result, a data region can be widened by reducing a clock region, i.e., the mirror mark portion M and the pit P, thereby making it possible to attain high-density optical recording medium 1.

Further, explanation has been made through the case where the optical recording medium 1 is provided with the wobble 2 of one period (A3) alone. However, the wobble 2 of two periods (2×A3) may alternatively be provided. Since the period of the wobble 2 is sufficiently longer than the beam spot size D1, even when the wobble 2 is of two periods, the address leakage signal has the same amplitude as that in the case of the wobble 2 of one period.

Further, in the foregoing embodiments, explanation has been made through the case where the wobble 2 is provided only on one side of a recording track. However, the wobble 2 may alternatively be provided on both sides of a land L and/or a groove G making up the recording track. For example, an optical recording medium 71 shown in FIG. 20 has an address region A21 recording an address for the groove G and an address region A21' recording an address for the land L. The address region A21 is provided with a wobble 2 such that the groove G is given wobbles on both side walls on the same phase. Likewise, the address region A21' is provided with a wobble 2' such that the land L is given wobbles on both side walls on the same phase. The wobbles 2 and 2' have the amplitude A2 of 0.180 μm (A1=A2/2), and the length A3 of one period which is 1.448 μm (A4=A3/2). Note that, the optical recording medium 71 may be provided with at least one of the address regions A21 and A21'.

Figure 20:
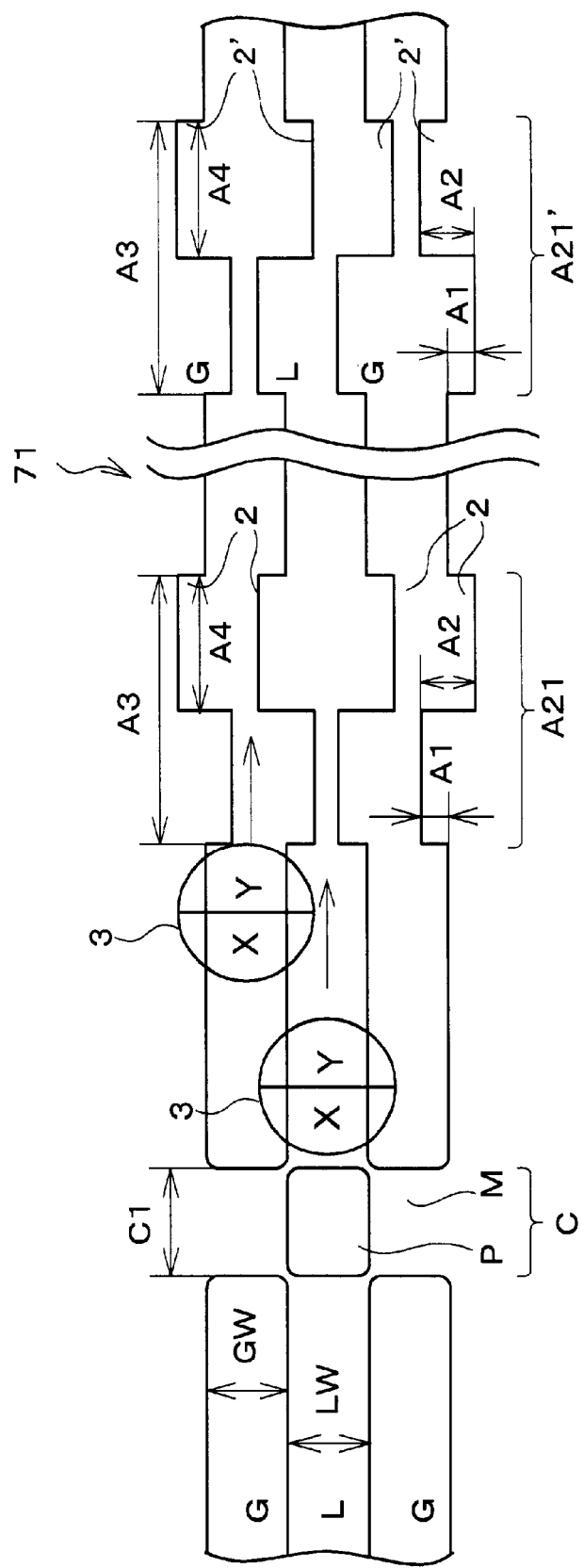
FIG. 20 is an explanatory view showing a main part of an optical recording medium according to yet another embodiment of the present invention, and in particular the forms of a land and grooves and the forms of wobbles respectively provided therein.

As shown in FIG. 20, in the address region A21, when the beam spot 3 scans the land L, the amplitude of the address leakage signal increases due to deviation by 180° in the phase of the wobble 2. Here, it is also assumed that the address regions A21 and A21' are reproduced by the first optical pickup 12a.

Table 3 below shows results of an examination in which examined were, as with Example 1, the amplitude of a normalized address leakage signal obtained for each track width LW, and a threshold value R in that case, and a normalized clock mark length to obtain that threshold value R.

TABLE 3

| TRACK WIDTH (μm) | NORMALIZED ADDRESS LEAKAGE SIGNAL AMPLITUDE | THRESHOLD VALUE | NORMALIZED CLOCK MARK LENGTH |
|---|---|---|---|
| 0.535 | 0.288 | 0.346 | 0.30 |
| 0.600 | 0.244 | 0.293 | 0.17 |
| 0.800 | 0.118 | 0.142 | 0.07 |
| 1.000 | 0.038 | 0.046 | 0.05 |

The results shown in Table 3 indicate that the threshold value R is 0.346 in the case where the maximum value is adopted so that a clock signal can surely be obtained even when the track width LW varied. In addition, the normalized clock mark length in that case is 0.30. Consequently, it is preferable that the optical recording medium 71 has the normalized clock mark length of not less than 0.30.

Examination of the Beam Spot Size and the Clock Mark Length in Different Arrangements of the Recording Track Next, the following will explain the results of an examination in which a relationship between the beam spot size D1 and the clock mark length C1 in different arrangements of the recording track was examined. Here, the first optical pickup 12a used in Example 1 and the second optical pickup 12b used in Example 2 were adopted, the first optical pickup 12a having the wavelength λ of 655 nm, the beam spot size D1 of 0.83 μm, and the numerical aperture NA of 0.65, and the second optical pickup 12b having the wavelength λ of 410 nm, the beam spot size D1 of 0.52 μm, and the numerical aperture NA of 0.65.

The arrangements of a track used in an optical recording medium according to the present embodiment include the following three types:

① an arrangement according to the land and groove recording system in which both the land and groove are provided with a clock mark (the optical recording medium 1 of FIG. 1);

② an arrangement according to the land recording system in which both the land and groove are provided with a clock mark (the optical recording medium 51 of FIG. 14); and ③ an arrangement according to the land recording system in which only the recording track (the land L) is provided with a clock mark (the optical recording medium 61 of FIG. 15).

FIG. 21 shows results of an examination of a relationship between the beam spot size D1 and the clock mark length C1 with regard to the above three types of optical recording media 1, 51 and 61.

It is understood from FIG. 21 that, in the optical recording media 1, 51 and 61 having differently arranged recording tracks, the normalized TPP signal amplitudes are different, but characteristics are the same.

Next, using the first optical pickup 12a, a value of the normalized TPP signal amplitude in the vicinity of the maximum value, and a normalized clock mark length in that case were examined with regard to the optical recording media 51 and 61. As a result, it is made clear that, in either of the arrangements of the track, the normalized TPP signal shows the maximum value when the normalized clock mark length is in a range between 0.66 and 0.72 and that a desirable clock signal can be obtained within that range.

Likewise, it is understood that, when the second optical pickup 12b was used, in either of the arrangements of the track, the normalized TPP signal shows the maximum value when the normalized clock mark length is in a range between 0.66 and 0.72, and that a desirable clock signal can be obtained within that range.

It is understood from the above results that a clock generating TPP signal free from distortion can be obtained even when the arrangement of the recording track varies as in the case of the optical recording media 1, 51 and 61. Further, in order to generate a clock signal in a state of little jitter, it is preferable that the normalized clock mark length (CM) is set at 1.0 or less (that the clock mark length C1 is set at not more than the beam spot size), that is, $$CM \leq 1.0.$$

Further, in order to generate a desirable clock signal by increasing the amplitude of a TPP signal to be detected, it is further preferable that the normalized clock mark length (CM) holds:

$$0.66 \leq CM \leq 0.72.$$

Further, in order to attain facilities as above, when considering compatibility with laser beams of wavelengths λ1 and λ2 (λ1>λ2), for example, the compatibility in the case of using the optical pickup 12a having the red semiconductor laser mounted thereon and in the case of using the optical pickup 12b having the bluish purple semiconductor laser mounted thereon, a preferable range of the clock mark length C1 is given as:

$$0.66 \times D2 \leq C1 \leq 0.72 \times D1,$$

where D1 is a laser spot size of the laser light having the wavelength λ1, and D2 is a laser spot size of the laser light having the wavelength λ2.

As discussed, since in the respective optical recording media 1, 51 and 61, the relationship between the beam spot size D1 and the clock mark length C1 is set as above, it is possible to surely detect a clock signal in the state of little jitter. In addition, the clock signal can be detected even by the optical pickups 12 of two different types in which the beam spot size D1 is different.

Further, In Examples 3, 4, 5 and 6 above, explanation has been made though the case where the optical recording media 51 and 61 are of the land recording system. However, alternatively, the groove recording system may be adopted. In that case, an application of the arrangement is self-explanatory, and the clock signal can similarly be detected.

Further, with regard to the optical recording media 51 and 61 adopting the land recording system, an arrangement including a wobble 2 recording an address has not been described. However, in the arrangement including the wobble 2, setting the clock mark length as with the optical recording medium 1 prevents an adverse effect of the address leakage signal.

Further, in the foregoing Examples was used the first optical pickup 12a having an arrangement in which the wavelength λ is 655 nm, and the numerical aperture NA is 0.65. However, the wavelength λ may alternatively be in a range between 630 nm and 680 nm. Further, when the numerical aperture NA is appropriately set so that the beam spot size D1 as above can be obtained, the clock signal can similarly be detected properly. Likewise, though the second optical pickup 12b having the wavelength λ of 410 nm, and the numerical aperture NA of 0.65 was used in the foregoing Examples, an optical pickup having the wavelength λ in a range between 390 nm and 430 nm and the appropriate numerical aperture NA as above can alternatively be used.

As discussed, an optical recording medium of the present invention has an arrangement in which a groove and/or a land composing a recording track includes an interrupted portion of a predetermined length in a direction of the recording track, and the interrupted portion is a control signal mark to obtain a control signal, wherein: when, by the length of the control signal mark and a spot size of a laser to be emitted to the recording track, (the length of the control signal mark)/(the spot size of the laser)=CM, $0.66 \leq CM \leq 0.72$.

The control signal mark is reproduced by an optical pickup, thereby obtaining, for example, a tangential push pull (TPP) signal, and generating from this control signal generating TPP signal a control signal, such as a clock signal.

When using a reproducing signal from the optical pickup to detect the control signal generating TPP signal, the amplitude of the reproducing signal from the optical pickup is compared with a predetermined threshold value, thereby discriminating the control signal generating TPP signal. In that case, in order to accurately perform the discrimination, it is preferable that the amplitude of the control signal generating TPP signal is set to be large.

Accordingly, the inventors of the present application studied a relationship between the control signal mark length and the laser spot size that can increase the amplitude of a control signal generating TPP signal, and discovered the relationship as discussed.

Namely, by setting so that $0.66 \leq CM \leq 0.72$ when (the control signal mark length)/(the laser spot size)=CM, a control signal generating TPP signal having a large amplitude was obtained. This enables a desirable control signal to be obtained surely and in a state without distortion.

Further, by setting the control signal mark length and the laser spot size to establish the foregoing relationship, a necessary control signal mark length can be shortened. Consequently, in an optical recording medium, a region to record a control signal can reduced, thereby enabling high-density recording and reproduction.

Another optical recording medium according to the present invention has an arrangement in which a groove and/or a land composing a recording track includes an interrupted portion of a predetermined length in a direction of the recording track, and the interrupted portion is a control signal mark to obtain a control signal, and which is capable of recording and/reproduction by laser light having wavelengths λ1 and λ2 (λ1>λ2), wherein: when D1 is a laser spot size of the laser light having the wavelength λ1, and D2 is a laser spot size of the laser light having the wavelength λ2, the length C1 of the control signal mark satisfies $0.66 \times D2 \leq C1 \leq 0.72 \times D1$.

The control signal mark is reproduced by an optical pickup, thereby obtaining, for example, a tangential push pull (TPP) signal, and generating from this control signal generating TPP signal a control signal, such as a clock signal.

When using a reproducing signal from the optical pickup to detect the control signal generating TPP signal, the amplitude of the reproducing signal from the optical pickup is compared with a predetermined threshold value, thereby discriminating the control signal generating TPP signal. In that case, in order to accurately perform the discrimination, it is preferable that the amplitude of the control signal generating TPP signal is set to be large.

Accordingly, the inventors of the present application studied a relationship between the control signal mark length and the laser spot size that can increase the amplitude of a control signal generating TPP signal, and discovered the relationship as discussed. Further, in that case, considered was a point that, in order to allow an optical recording medium to have general versatility, the optical recording medium was set to be compatible with the respective laser light of wavelengths λ1 and λ2 to be used, for example, in the case of using an optical pickup having a red semiconductor laser and an optical pickup having a bluish purple semiconductor laser.

More specifically, by having the arrangement in which, when D1 is a laser spot size of the laser light having the wavelength λ1, and D2 is a laser spot size of the laser light having the wavelength λ2, the length C1 of the control signal mark satisfies $0.66 \times D2 \leq C1 \leq 0.72 \times D1$, it was possible to obtain a control signal generating TPP signal having a large amplitude when using either of the laser light of wavelengths λ1 and λ2. This enables a desirable control signal to be obtained surely and in a state without distortion, for example, when using either of the optical pickup having the red semiconductor laser and the optical pickup having the bluish purple semiconductor laser.

Further, by setting the control signal mark length and the laser spot size to establish the foregoing relationship, a necessary control signal mark length can be shortened. Consequently, in an optical recording medium, a region to record a control signal can be reduced, thereby enabling high-density recording and reproduction.

Still another optical recording medium according to the present invention has an arrangement in which a groove and/or a land composing a recording track includes an interrupted portion of a predetermined length in a direction of the recording track, the interrupted portion is a control signal mark to obtain a first control signal and a second control signal is recorded by giving a wobble to at least one of side walls of the groove, wherein: when, by the length of the control signal mark and a spot size of a laser to be emitted to the recording track, (the length of the control signal mark)/(the spot size of the laser)=CM, $0.11 \leq CM \leq 1.0$.

In the optical recording medium, reproducing a control signal mark by an optical pickup enables the first control signal, such as a tangential push pull (TPP) signal, to be obtained, from which a new control signal, such as a clock signal, is generated. Further, by reproducing a wobble portion of a side wall of the groove, for example, a push pull (PP) signal can be obtained, from which is generated, for example, an address signal (the second control signal). Further, by reproducing a wobble portion of a side wall of the groove, the TPP signal is outputted in addition to the PP signal. The TPP signal is an address leakage signal.

In the case where, for example, the first control signal is captured from a reproducing signal from the optical pickup, which includes the first and second control signals, the amplitudes of the first and second control signals are compared with a predetermined threshold value so as to discriminate between the two control signals. Further, in order to accurately detect the first control signal, it is necessary to set the first control signal to have an amplitude which is larger than the amplitude of the TPP signal (address leakage signal) that is detected by reproducing the wobble portion of the side wall of the groove.

Accordingly, the inventors of the present application studied a relationship between the control signal mark length and the laser spot size that can increase the amplitude of the first control signal so as to be larger than the amplitude of the TPP signal (address leakage signal) detected by reproducing the wobble portion of the side wall of the groove, and discovered the foregoing relationship.

More specifically, setting so that $0.11 \leq CM \leq 1.0$ when (the control signal mark length)/(the laser spot size)=CM enabled the first control signal to be larger than the TPP signal (address leakage signal) detected by reproducing the wobble portion of the side wall of the groove. Consequently, it is possible to accurately discriminate between the first control signal and the TPP signal (address leakage signal) detected by reproducing the wobble portion of the side wall of the groove, thereby surely detecting a control signal and obtaining a control signal free from distortion.

Further, by setting the control signal mark length and the laser spot size to establish the foregoing relationship, a necessary control signal mark length can be shortened. This reduces a region to record a control signal, thereby enabling high-density recording and reproduction.

Yet another optical recording medium according to the present invention has an arrangement in which a groove and/or a land composing a recording track includes an interrupted portion of a predetermined length in a direction of the recording track, the interrupted portion is a control signal mark to obtain a first control signal and a second control signal is recorded by giving a wobble to at least one of side walls of the groove, wherein: when, by the length of the control signal mark and a spot size of a laser to be emitted to the recording track, (the length of the control signal mark)/(the spot size of the laser)=CM, $0.66 \leq CM \leq 0.72$.

In the optical recording medium, reproducing a control signal mark by an optical pickup enables the first control signal, such as a tangential push pull (TPP) signal, to be obtained, from which a new control signal, such as a clock signal, is generated. Further, by reproducing a wobble portion of a side wall of the groove, for example, a push pull (PP) signal can be obtained, from which is generated, for example, an address signal (the second control signal). Further, by reproducing a wobble portion of a side wall of the groove, the TPP signal is outputted in addition to the PP signal. The TPP signal is an address leakage signal.

In the case where, for example, the first control signal is captured from a reproducing signal from the optical pickup, which includes the first and second control signals, the amplitudes of the first and second control signals are compared with a predetermined threshold value so as to discriminate between the two control signals. In that case, in order to accurately discriminate between the two control signals, for example, it is preferable to increase the amplitude of the first control signal.

Accordingly, the inventors of the present application studied a relationship between the control signal mark length and the laser spot size that can increase the amplitude of the first control signal, and discovered the foregoing relationship.

More specifically, by setting so that $0.66 \leq CM \leq 0.72$ when (the control signal mark length)/(the laser spot size)=CM, the first control signal having a large amplitude was obtained. Consequently, it is possible to accurately discriminate between the first control signal and the TPP signal (address leakage signal) detected by reproducing the wobble portion of the side wall of the groove, thereby surely detecting a control signal and obtaining a control signal free from distortion.

Further, by setting the control signal mark length and the laser spot size to establish the foregoing relationship, a necessary control signal mark length can be shortened. This reduces a region to record a control signal, thereby enabling high-density recording and reproduction.

Still another optical recording medium according to the present invention has an arrangement in which a groove and/or a land composing a recording track includes an interrupted portion of a predetermined length in a direction of the recording track, and the interrupted portion is a control signal mark to obtain a first control signal, and a second control signal is recorded by giving a wobble to at least one of side walls of the groove, and which is capable of recording and/or reproduction by laser light having wavelengths $\lambda 1$ and $\lambda 2$ ($\lambda 1 > \lambda 2$), wherein: when D1 is a laser spot size of the laser light having the wavelength $\lambda 1$, and D2 is a laser spot size of the laser light having the wavelength $\lambda 2$, the length C1 of the control signal mark satisfies $0.11 \times D1 \leq C1 \leq D2$.

In the optical recording medium, reproducing a control signal mark by an optical pickup enables the first control signal, such as a tangential push pull (TPP) signal, to be obtained, from which a new control signal, such as a clock signal, is generated. Further, by reproducing a wobble portion of a side wall of the groove, for example, a push pull (PP) signal can be obtained, from which is generated, for example, an address signal (the second control signal). Further, by reproducing a wobble portion of a side wall of the groove, the TPP signal is outputted in addition to the PP signal. The TPP signal is an address leakage signal.

In the case where, for example, the first control signal is captured from a reproducing signal from the optical pickup, which includes the first and second control signals, the amplitudes of the first and second control signals are compared with a predetermined threshold value so as to discriminate between the two control signals. Further, in order to accurately detect the first control signal, it is necessary to set the first control signal to have an amplitude which is larger than the amplitude of the TPP signal (address leakage signal) that is detected by reproducing the wobble portion of the side wall of the groove.

Accordingly, the inventors of the present application studied a relationship between the control signal mark length and the laser spot size that can increase the amplitude of the first control signal so as to be larger than the amplitude of the TPP signal (address leakage signal) detected by reproducing the wobble portion of the side wall of the groove, and discovered the foregoing relationship. Further, in that case, considered was a point that, in order to allow an optical recording medium to have general versatility, the optical recording medium was set to be compatible with the respective laser light of wavelengths $\lambda 1$ and $\lambda 2$ to be used, for example, in the case of using an optical pickup having a red semiconductor laser and an optical pickup having a bluish purple semiconductor laser.

More specifically, by having the arrangement in which, when D1 is a laser spot size of the laser light having the wavelength $\lambda 1$, and D2 is a laser spot size of the laser light having the wavelength $\lambda 2$ ($\lambda 1 > \lambda 2$), the length C1 of the control signal mark satisfies $0.11 \times D1 \leq C1 \leq D2$, it was possible to obtain the first control signal having a larger amplitude than that of a TPP signal (an address leakage signal) detected by reproducing the wobble portion of the side wall of the groove when using either of the laser light of wavelengths $\lambda 1$ and $\lambda 2$. Consequently, when using, for example, either of the optical pickup having the red semiconductor laser and the optical pickup having the bluish purple semiconductor laser, it is possible to surely detect the first control signal, thus surely detecting a control signal and obtaining a control signal free from distortion.

Further, by setting the control signal mark length and the laser spot size to establish the foregoing relationship, a necessary control signal mark length can be shortened. Consequently, in an optical recording medium, a region to record a control signal can be reduced, thereby enabling high-density recording and reproduction.

The optical recording medium above may have an arrangement in which the depth of the groove with respect to an upper surface of the land is set to be in a range between 0.035 $\mu$m and 0.040 $\mu$m.

The inventors of the present application studied the depth of the groove that can increase the amplitude of a control signal obtained from a reproducing signal of the optical pickup, and discovered the range of numerical values as above. In that case, considered was a point that, in order to allow an optical recording medium to have general versatility, the optical recording medium was set to be compatible with an optical pickup having a red semiconductor laser and an optical pickup having a bluish purple semiconductor laser.

Consequently, by setting the depth of a groove to be in the above range, it is possible to appropriately detect a control signal from a reproducing signal of an optical pickup when using either of the optical pickup having the red semiconductor laser and the optical pickup having the bluish purple semiconductor laser.

An optical recording and reproducing device according to the present invention uses an optical recording medium in which a groove and/or a land composing a recording track includes an interrupted portion of a predetermined length in a direction of the recording track, and the interrupted portion is a control signal mark, such as a clock mark, to obtain such a control signal as a clock signal, wherein: when, by the length of the control signal mark and a spot size of a laser to be emitted to the recording track, (the length of the control signal mark)/(the spot size of the laser)=CM, $0.66 \leq CM \leq 0.72$, the optical recording and reproducing device including: threshold value setting means for setting such a threshold value as to detect a control signal which was obtained from the optical recording medium at least based on an amplitude of the control signal; control signal detecting means for making a comparison between the control signal and the threshold value so as to detect a control signal; and control signal generating means for generating a new control signal based on the control signal detected by the control signal detecting means.

With this arrangement, since CM is set so that $0.66 \leq CM \leq 0.72$, it is possible to obtain a control signal having a large amplitude from the control signal detecting means. This enables the control signal generating means to generate a desirable control signal surely and in a state without distortion.

An optical recording and reproducing device according to the present invention uses an optical recording medium in which a groove and/or a land composing a recording track includes an interrupted portion of a predetermined length in a direction of the recording track, and the interrupted portion is a control signal mark, such as a clock mark, to obtain such a control signal as a clock signal, wherein: when D1 is a laser spot size of the laser light having the wavelength $\lambda 1$, and D2 is a laser spot size of the laser light having the wavelength $\lambda 2$, the length C1 of the control signal mark satisfies $0.66 \times D2 \leq C1 \leq 0.72 \times D1$, the optical recording and reproducing device including: threshold value setting means for setting such a threshold value as to detect a control signal which was obtained from the optical recording medium at least based on an amplitude of the control signal; control signal detecting means for making a comparison between the control signal and the threshold value so as to detect a control signal; and control signal generating means for generating a new control signal based on the control signal detected by the control signal detecting means.

With this arrangement, since used is the optical recording medium in which the length C1 of the control signal mark satisfies $0.66 \times D2 \leq C1 \leq 0.72 \leq D1$, it is possible to obtain a control signal generating TPP signal having a large amplitude when using either of the laser light having the wavelength $\lambda 1$ and the laser light having the wavelength $\lambda 2$. This enables a desirable control signal to be obtained surely and in a state without distortion when using, for example, either of the optical pickup having the red semiconductor laser and the optical pickup having the bluish purple semiconductor laser.

Another optical recording and reproducing device according to the present invention uses an optical recording medium in which a groove and/or a land composing a recording track includes an interrupted portion of a predetermined length in a direction of the recording track, the interrupted portion is a control signal mark to obtain a first control signal and a second control signal is recorded by giving a wobble to at least one of side walls of the groove, wherein: when, by the length of the control signal mark and a spot size of a laser to be emitted to the recording track, (the length of the control signal mark)/(the spot size of the laser)=CM, $0.11 \leq CM \leq 1.0$, the optical recording and reproducing device including: threshold value setting means for setting such a threshold value as to discriminate between first and second control signals which were obtained from the optical recording medium at least based on amplitudes of the control signals; control signal discriminating means for discriminating between the first and second control signals by comparing the first and second control signals with the threshold value; and control signal generating means for generating a third control signal based on the control signal discriminated by the control signal discriminating means.

With this arrangement, since CM is set so that $0.11 \leq CM \leq 1.0$, it is possible to make the first control signal larger than a TPP signal (address leakage signal) detected by reproducing the wobble portion of the side wall of the groove. Consequently, the control signal discriminating means can accurately detect the first control signal when using either of the optical pickup having the red semiconductor laser and the optical pickup having the bluish purple semiconductor laser. As a result, it is possible to surely detect a control signal, thereby enabling the control signal generating means to generate a third control signal free from distortion.

Another optical recording and reproducing device according to the present invention uses an optical recording medium in which a groove and/or a land composing a recording track includes an interrupted portion of a predetermined length in a direction of the recording track, the interrupted portion is a control signal mark to obtain a first control signal and a second control signal is recorded by giving a wobble to at least one of side walls of the groove, wherein: when, by the length of the control signal mark and a spot size of a laser to be emitted to the recording track, (the length of the control signal mark)/(the spot size of the laser)=CM, $0.66 \leq CM \leq 0.72$, the optical recording and reproducing device including: threshold value setting means for setting such a threshold value as to discriminate between first and second control signals which were obtained from the optical recording medium at least based on amplitudes of the control signals; control signal discriminating means for discriminating between the first and second control signals by comparing the first and second control signals with the threshold value; and control signal generating means for generating a third control signal based on the control signal discriminated by the control signal discriminating means.

With this arrangement, since CM is set so that $0.66 \leq CM \leq 0.72$, it is possible to increase the amplitude of the first control signal. Consequently, the control signal discriminating means can accurately detect the first control signal when using either of the optical pickup having the red semiconductor laser and the optical pickup having the bluish purple semiconductor laser. As a result, it is possible to surely detect a control signal, thereby enabling the control signal generating means to generate a third control signal free from distortion.

Another optical recording and reproducing device according to the present invention uses an optical recording medium in which a groove and/or a land composing a recording track includes an interrupted portion of a predetermined length in a direction of the recording track, and the interrupted portion is a control signal mark to obtain a first control signal, and a second control signal is recorded by giving a wobble to at least one of side walls of the groove, wherein: when D1 is a laser spot size of the laser light having the wavelength $\lambda 1$, and D2 is a laser spot size of the laser light having the wavelength $\lambda 2$, the length C1 of the control signal mark satisfies $0.11 \times D1 \leq C1 \leq D2$, the optical recording and reproducing device including: threshold value setting means for setting such a threshold value as to discriminate between first and second control signals which were obtained from the optical recording medium at least based on amplitudes of the control signals; control signal discriminating means for discriminating between the first and second control signals by comparing the first and second control signals with the threshold value; and control signal generating means for generating a third control signal based on the control signal discriminated by the control signal discriminating means.

With this arrangement, since used is the optical recording medium in which the length C1 of the control signal mark satisfies $0.11 \times D1 \leq C1 \leq D2$, it is possible to make the first control signal larger than a TPP signal (address leakage signal) detected by reproducing the wobble portion of the side wall of the groove. Consequently, the first control signal can accurately be detected when using either of the optical pickup having the red semiconductor laser and the optical pickup having the bluish purple semiconductor laser. As a result, it is possible to surely detect a control signal, while obtaining a control signal free from distortion.

A recording and reproducing method for an optical recording medium according to the present invention is capable of performing recording and/or reproduction of information with respect to the optical recording medium in which a groove and/or a land composing a recording track includes an interrupted portion of a predetermined length in a direction of the recording track, and the interrupted portion is a control signal mark to obtain a first control signal, and a second control signal is recorded by giving a wobble to at least one of side walls of the groove, wherein: when D is a laser spot size of laser light to be emitted to the optical recording medium, and C1 is the length of the control signal mark, it is set to satisfy $0.11 \times D \leq C1 \leq D$.

In the optical recording medium, reproducing a control signal mark by an optical pickup enables the first control signal, such as a tangential push pull (TPP) signal, to be obtained, from which a new control signal, such as a clock signal, is generated. Further, by reproducing a wobble portion of a side wall of the groove, for example, a push pull (PP) signal can be obtained, from which is generated, for example, an address signal (the second control signal). Further, by reproducing a wobble portion of a side wall of the groove, the TPP signal is outputted in addition to the PP signal. The TPP signal is an address leakage signal.

In the case where, for example, the first control signal is captured from a reproducing signal from the optical pickup, which includes the first and second control signals, the amplitudes of the first and second control signals are compared with a predetermined threshold value so as to discriminate between the two control signals. Further, in order to accurately detect the first control signal, it is necessary to set the first control signal to have an amplitude which is larger than the amplitude of the TPP signal (address leakage signal) that is detected by reproducing the wobble portion of the side wall of the groove.

Accordingly, the inventors of the present application studied a relationship between the control signal mark length and the laser spot size that can increase the amplitude of the first control signal so as to be larger than the amplitude of the TPP signal (address leakage signal) detected by reproducing the wobble portion of the side wall of the groove, and discovered the foregoing relationship.

More specifically, by setting to satisfy $0.11 \times D \leq C1 \leq D$ when D is a laser spot size of the laser light to be emitted to the optical recording medium, and C1 is the length of the control signal mark, it was possible to make the amplitude of the first control signal larger than the amplitude of the second control signal. Consequently, it is possible to accurately discriminate between the first control signal and the TPP signal (address leakage signal) detected by reproducing the wobble portion of the side wall of the groove. As a result, it is possible to accurately detect a control signal, while obtaining a control signal without distortion.

Further, by setting the control signal mark length and the laser spot size to establish the foregoing relationship, a necessary control signal mark length can be shortened. Consequently, in an optical recording medium, a region to record a control signal can be reduced, thereby enabling high-density recording and reproduction.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical recording medium in which a groove and/or a land composing a recording track includes an interrupted portion of a predetermined length in a direction of the recording track, and the interrupted portion is a control signal mark to obtain a control signal, wherein:

when, by the length of the control signal mark and a spot size of a laser to be emitted to the recording track, (the length of the control signal mark)/(the spot size of the laser)=CM, $$CM \leq 1.0.$$

2. The optical recording medium set forth in claim 1, wherein:

the depth of the groove with respect to an upper side of the land is set in a range between 0.035 μm and 0.040 μm.

3. An optical recording and reproducing device using the optical recording medium of claim 1, comprising:

threshold value setting means for setting such a threshold value as to detect a control signal which was obtained from the optical recording medium at least based on an amplitude of the control signal;

control signal detecting means for making a comparison between the control signal and the threshold value so as to detect a control signal; and control signal generating means for generating a new control signal based on the control signal detected by the control signal detecting means.

4. An optical recording medium in which a groove and/or a land composing a recording track includes an interrupted portion of a predetermined length in a direction of the recording track, and the interrupted portion is a control signal mark to obtain a control signal, wherein:

when, by the length of the control signal mark and a spot size of a laser to be emitted to the recording track, (the length of the control signal mark)/(the spot size of the laser)=CM, $$0.66 \leq CM \leq 0.72.$$

5. The optical recording medium set forth in claim 4, wherein:

the depth of the groove with respect to an upper side of the land is set in a range between 0.035 μm and 0.040 μm.

6. An optical recording and reproducing device using the optical recording medium of claim 4, comprising:

threshold value setting means for setting such a threshold value as to detect a control signal which was obtained from the optical recording medium at least based on an amplitude of the control signal;

control signal detecting means for making a comparison between the control signal and the threshold value so as to detect a control signal; and control signal generating means for generating a new control signal based on the control signal detected by the control signal detecting means.

7. An optical recording medium in which a groove and/or a land composing a recording track includes an interrupted portion of a predetermined length in a direction of the recording track, and the interrupted portion is a control signal mark to obtain a control signal, and which is capable of recording and/or reproduction by laser light having wavelengths $\lambda 1$ and $\lambda 2$ ($\lambda 1 > \lambda 2$), wherein:

when D1 is a laser spot size of the laser light having the wavelength $\lambda 1$, and D2 is a laser spot size of the laser light having the wavelength $\lambda 2$, the length C1 of the control signal mark satisfies $$0.66 \times D2 \leq C1 \leq 0.72 \times D1.$$

8. The optical recording medium set forth in claim 7, wherein:

the depth of the groove with respect to an upper side of the land is set in a range between 0.035 μm and 0.040 μm.

9. An optical recording and reproducing device using the optical recording medium of claim 7, comprising:

threshold value setting means for setting such a threshold value as to detect a control signal which was obtained from the optical recording medium at least based on an amplitude of the control signal;

control signal detecting means for making a comparison between the control signal and the threshold value so as to detect a control signal; and control signal generating means for generating a new control signal based on the control signal detected by the control signal detecting means.

10. An optical recording medium in which a groove and/or a land composing a recording track includes an interrupted portion of a predetermined length in a direction of the recording track, the interrupted portion is a control signal mark to obtain a first control signal and a second control signal is recorded by giving a wobble to at least one of side walls of the groove, wherein:

when, by the length of the control signal mark and a spot size of a laser to be emitted to the recording track, (the length of the control signal mark)/(the spot size of the laser)=CM, $$0.11 \leq CM \leq 1.0.$$

11. The optical recording medium set forth in claim 10, wherein:

the depth of the groove with respect to an upper side of the land is set in a range between 0.035 μm and 0.040 μm.

12. An optical recording and reproducing device using the optical recording medium of claim 10, comprising:

threshold value setting means for setting such a threshold value as to discriminate between first and second control signals which were obtained from the optical recording medium at least based on amplitudes of the control signals;

control signal discriminating means for discriminating between the first and second control signals by comparing the first and second control signals with the threshold value; and control signal generating means for generating a third control signal based on the control signal discriminated by the control signal discriminating means.

13. An optical recording medium in which a groove and/or a land composing a recording track includes an interrupted portion of a predetermined length in a direction of the recording track, the interrupted portion is a control signal mark to obtain a first control signal and a second control signal is recorded by giving a wobble to at least one of side walls of the groove, wherein:

when, by the length of the control signal mark and a spot size of a laser to be emitted to the recording track, (the length of the control signal mark)/(the spot size of the laser)=CM, $$0.66 \leq CM \leq 0.72.$$

14. The optical recording medium set forth in claim 13, wherein:

the depth of the groove with respect to an upper side of the land is set in a range between 0.035 μm and 0.040 μm.

15. An optical recording and reproducing device using the optical recording medium of claim 13, comprising:

threshold value setting means for setting such a threshold value as to discriminate between first and second control signals which were obtained from the optical recording medium at least based on amplitudes of the control signals;

control signal discriminating means for discriminating between the first and second control signals by comparing the first and second control signals with the threshold value; and control signal generating means for generating a third control signal based on the control signal discriminated by the control signal discriminating means.

16. An optical recording medium in which a groove and/or a land composing a recording track includes an interrupted portion of a predetermined length in a direction of the recording track, and the interrupted portion is a control signal mark to obtain a first control signal, and a second control signal is recorded by giving a wobble to at least one of side walls of the groove, and which is capable of recording and/or reproduction by laser light having wavelengths λ1 and λ2 (λ1>λ2), wherein:

when D1 is a laser spot size of the laser light having the wavelength λ1, and D2 is a laser spot size of the laser light having the wavelength λ2, the length C1 of the control signal mark satisfies $$0.11 \times D1 \leq C1 \leq D2.$$

17. The optical recording medium set forth in claim 16, wherein:

the depth of the groove with respect to an upper side of the land is set in a range between 0.035 μm and 0.040 μm.

18. An optical recording and reproducing device using the optical recording medium of claim 16, comprising:

threshold value setting means for setting such a threshold value as to discriminate between first and second control signals which were obtained from the optical recording medium at least based on amplitudes of the control signals;

control signal discriminating means for discriminating between the first and second control signals by comparing the first and second control signals with the threshold value; and control signal generating means for generating a third control signal based on the control signal discriminated by the control signal discriminating means.

19. A recording and reproducing method for an optical recording medium, capable of performing recording and/or reproduction of information with respect to an optical recording medium in which a groove and/or a land composing a recording track includes an interrupted portion of a predetermined length in a direction of the recording track, and the interrupted portion is a control signal mark to obtain a control signal, wherein:

when D is a laser spot size of laser light to be emitted to the optical recording medium, and C1 is the length of the control signal mark, it is set to satisfy $$0.66 \times D \leq C1 \leq 0.72 \times D.$$

20. A recording and reproducing method for an optical recording medium, capable of performing recording and/or reproduction of information with respect to the optical recording medium in which a groove and/or a land composing a recording track includes an interrupted portion of a predetermined length in a direction of the recording track, and the interrupted portion is a control signal mark to obtain a first control signal, and a second control signal is recorded by giving a wobble to at least one of side walls of the groove, wherein:

when D is a laser spot size of laser light to be emitted to the optical recording medium, and C1 is the length of the control signal mark, it is set to satisfy $$0.11 \times D \leq C1 \leq D.$$

\* \* \* \* \*